United States Patent
Ramerth et al.

(10) Patent No.: US 8,706,472 B2
(45) Date of Patent: Apr. 22, 2014

(54) METHOD FOR DISAMBIGUATING MULTIPLE READINGS IN LANGUAGE CONVERSION

(75) Inventors: Brent D. Ramerth, San Francisco, CA (US); Devang K. Naik, San Jose, CA (US); Douglas R. Davidson, Palo Alto, CA (US); Jannes G. A. Dolfing, Daly City, CA (US); Jia Pu, Mountain View, CA (US)

(73) Assignee: Apple Inc., Cupertino, CA (US)

(*) Notice: Subject to any disclaimer, the term of this patent is extended or adjusted under 35 U.S.C. 154(b) by 36 days.

(21) Appl. No.: 13/208,222

(22) Filed: Aug. 11, 2011

(65) Prior Publication Data

US 2013/0041647 A1    Feb. 14, 2013

(51) Int. Cl.
    G06F 17/28    (2006.01)
(52) U.S. Cl.
    USPC .............. 704/2; 704/9; 704/251; 704/255; 704/257
(58) Field of Classification Search
    USPC .................. 704/1–10, 251, 255, 257
    See application file for complete search history.

(56) References Cited

U.S. PATENT DOCUMENTS

| | | | |
|---|---|---|---|
| 3,704,345 A | 11/1972 | Coker et al. | |
| 3,828,132 A | 8/1974 | Flanagan et al. | |
| 3,979,557 A | 9/1976 | Schulman et al. | |
| 4,278,838 A | 7/1981 | Antonov | |
| 4,282,405 A | 8/1981 | Taguchi | |
| 4,310,721 A | 1/1982 | Manley et al. | |
| 4,348,553 A | 9/1982 | Baker et al. | |
| 4,653,021 A | 3/1987 | Takagi | |
| 4,688,195 A | 8/1987 | Thompson et al. | |
| 4,692,941 A | 9/1987 | Jacks et al. | |
| 4,718,094 A | 1/1988 | Bahl et al. | |
| 4,724,542 A | 2/1988 | Williford | |
| 4,726,065 A | 2/1988 | Froessl | |
| 4,727,354 A | 2/1988 | Lindsay | |
| 4,776,016 A | 10/1988 | Hansen | |
| 4,783,807 A | 11/1988 | Marley | |
| 4,811,243 A | 3/1989 | Racine | |
| 4,819,271 A | 4/1989 | Bahl et al. | |

(Continued)

FOREIGN PATENT DOCUMENTS

| | | | |
|---|---|---|---|
| CH | 681573 A5 | 4/1993 |
| DE | 3837590 A1 | 5/1990 |

(Continued)

OTHER PUBLICATIONS

Bussler, C., et al., "Web Service Execution Environment (WSMX)," Jun. 3, 2005, W3C Member Submission, http://www.w3.org/Submission/WSMX, 29 pages.

(Continued)

*Primary Examiner* — Douglas Godbold
*Assistant Examiner* — Ernest Estes
(74) *Attorney, Agent, or Firm* — Morrison & Foerster LLP

(57) ABSTRACT

Disambiguating multiple readings in language conversion is disclosed, including: receiving an input data to be converted into a set of characters comprising a symbolic representation of the input data in a target symbolic system; and using a language model that distinguishes between a first reading and a second reading of a character of the target symbolic system to determine a probability that the heteronymous character should be used to represent a corresponding portion of the input data.

27 Claims, 10 Drawing Sheets

(56) References Cited

U.S. PATENT DOCUMENTS

| | | |
|---|---|---|
| 4,827,520 A | 5/1989 | Zeinstra |
| 4,829,576 A | 5/1989 | Porter |
| 4,833,712 A | 5/1989 | Bahl et al. |
| 4,839,853 A | 6/1989 | Deerwester et al. |
| 4,852,168 A | 7/1989 | Sprague |
| 4,862,504 A | 8/1989 | Nomura |
| 4,878,230 A | 10/1989 | Murakami et al. |
| 4,903,305 A | 2/1990 | Gillick et al. |
| 4,905,163 A | 2/1990 | Garber et al. |
| 4,914,586 A | 4/1990 | Swinehart et al. |
| 4,914,590 A | 4/1990 | Loatman et al. |
| 4,944,013 A | 7/1990 | Gouvianakis et al. |
| 4,955,047 A | 9/1990 | Morganstein et al. |
| 4,965,763 A | 10/1990 | Zamora |
| 4,974,191 A | 11/1990 | Amirghodsi et al. |
| 4,977,598 A | 12/1990 | Doddington et al. |
| 4,992,972 A | 2/1991 | Brooks et al. |
| 5,010,574 A | 4/1991 | Wang |
| 5,020,112 A | 5/1991 | Chou |
| 5,021,971 A | 6/1991 | Lindsay |
| 5,022,081 A | 6/1991 | Hirose et al. |
| 5,027,406 A | 6/1991 | Roberts et al. |
| 5,031,217 A | 7/1991 | Nishimura |
| 5,032,989 A | 7/1991 | Tornetta |
| 5,040,218 A | 8/1991 | Vitale et al. |
| 5,047,617 A | 9/1991 | Shepard et al. |
| 5,057,915 A | 10/1991 | Von Kohorn |
| 5,072,452 A | 12/1991 | Brown et al. |
| 5,091,945 A | 2/1992 | Kleijn |
| 5,127,053 A | 6/1992 | Koch |
| 5,127,055 A | 6/1992 | Larkey |
| 5,128,672 A | 7/1992 | Kaehler |
| 5,133,011 A | 7/1992 | McKiel, Jr. |
| 5,142,584 A | 8/1992 | Ozawa |
| 5,164,900 A | 11/1992 | Bernath |
| 5,165,007 A | 11/1992 | Bahl et al. |
| 5,179,652 A | 1/1993 | Rozmanith et al. |
| 5,194,950 A | 3/1993 | Murakami et al. |
| 5,197,005 A | 3/1993 | Shwartz et al. |
| 5,199,077 A | 3/1993 | Wilcox et al. |
| 5,202,952 A | 4/1993 | Gillick et al. |
| 5,208,862 A | 5/1993 | Ozawa |
| 5,216,747 A | 6/1993 | Hardwick et al. |
| 5,220,639 A | 6/1993 | Lee |
| 5,220,657 A | 6/1993 | Bly et al. |
| 5,222,146 A | 6/1993 | Bahl et al. |
| 5,230,036 A | 7/1993 | Akamine et al. |
| 5,235,680 A | 8/1993 | Bijnagte |
| 5,267,345 A | 11/1993 | Brown et al. |
| 5,268,990 A | 12/1993 | Cohen et al. |
| 5,282,265 A | 1/1994 | Rohra Suda et al. |
| RE34,562 E | 3/1994 | Murakami et al. |
| 5,291,286 A | 3/1994 | Murakami et al. |
| 5,293,448 A | 3/1994 | Honda |
| 5,293,452 A | 3/1994 | Picone et al. |
| 5,297,170 A | 3/1994 | Eyuboglu et al. |
| 5,301,109 A | 4/1994 | Landauer et al. |
| 5,303,406 A | 4/1994 | Hansen et al. |
| 5,309,359 A | 5/1994 | Katz et al. |
| 5,317,507 A | 5/1994 | Gallant |
| 5,317,647 A | 5/1994 | Pagallo |
| 5,325,297 A | 6/1994 | Bird et al. |
| 5,325,298 A | 6/1994 | Gallant |
| 5,327,498 A | 7/1994 | Hamon |
| 5,333,236 A | 7/1994 | Bahl et al. |
| 5,333,275 A | 7/1994 | Wheatley et al. |
| 5,345,536 A | 9/1994 | Hoshimi et al. |
| 5,349,645 A | 9/1994 | Zhao |
| 5,353,377 A | 10/1994 | Kuroda et al. |
| 5,377,301 A | 12/1994 | Rosenberg et al. |
| 5,384,892 A | 1/1995 | Strong |
| 5,384,893 A | 1/1995 | Hutchins |
| 5,386,494 A | 1/1995 | White |
| 5,386,556 A | 1/1995 | Hedin et al. |
| 5,390,279 A | 2/1995 | Strong |
| 5,396,625 A | 3/1995 | Parkes |
| 5,400,434 A | 3/1995 | Pearson |
| 5,404,295 A | 4/1995 | Katz et al. |
| 5,412,756 A | 5/1995 | Bauman et al. |
| 5,412,804 A | 5/1995 | Krishna |
| 5,412,806 A | 5/1995 | Du et al. |
| 5,418,951 A | 5/1995 | Damashek |
| 5,424,947 A | 6/1995 | Nagao et al. |
| 5,434,777 A | 7/1995 | Luciw |
| 5,444,823 A | 8/1995 | Nguyen |
| 5,455,888 A | 10/1995 | Iyengar et al. |
| 5,469,529 A | 11/1995 | Bimbot et al. |
| 5,471,611 A | 11/1995 | McGregor |
| 5,475,587 A | 12/1995 | Anick et al. |
| 5,479,488 A | 12/1995 | Lenning et al. |
| 5,491,772 A | 2/1996 | Hardwick et al. |
| 5,493,677 A | 2/1996 | Balogh |
| 5,495,604 A | 2/1996 | Harding et al. |
| 5,502,790 A | 3/1996 | Yi |
| 5,502,791 A | 3/1996 | Nishimura et al. |
| 5,515,475 A | 5/1996 | Gupta et al. |
| 5,536,902 A | 7/1996 | Serra et al. |
| 5,537,618 A | 7/1996 | Boulton et al. |
| 5,574,823 A | 11/1996 | Hassanein et al. |
| 5,577,241 A | 11/1996 | Spencer |
| 5,578,808 A | 11/1996 | Taylor |
| 5,579,436 A | 11/1996 | Chou et al. |
| 5,581,655 A | 12/1996 | Cohen et al. |
| 5,584,024 A | 12/1996 | Shwartz |
| 5,596,676 A | 1/1997 | Swaminathan et al. |
| 5,596,994 A | 1/1997 | Bro |
| 5,608,624 A | 3/1997 | Luciw |
| 5,613,036 A | 3/1997 | Strong |
| 5,617,507 A | 4/1997 | Lee et al. |
| 5,619,694 A | 4/1997 | Shimazu |
| 5,621,859 A | 4/1997 | Schwartz et al. |
| 5,621,903 A | 4/1997 | Luciw et al. |
| 5,642,464 A | 6/1997 | Yue et al. |
| 5,642,519 A | 6/1997 | Martin |
| 5,644,727 A | 7/1997 | Atkins |
| 5,664,055 A | 9/1997 | Kroon |
| 5,675,819 A | 10/1997 | Schuetze |
| 5,682,539 A | 10/1997 | Conrad et al. |
| 5,687,077 A | 11/1997 | Gough, Jr. |
| 5,696,962 A | 12/1997 | Kupiec |
| 5,701,400 A | 12/1997 | Amado |
| 5,706,442 A | 1/1998 | Anderson et al. |
| 5,710,886 A | 1/1998 | Christensen et al. |
| 5,712,957 A | 1/1998 | Waibel et al. |
| 5,715,468 A | 2/1998 | Budzinski |
| 5,721,827 A | 2/1998 | Logan et al. |
| 5,727,950 A | 3/1998 | Cook et al. |
| 5,729,694 A | 3/1998 | Holzrichter et al. |
| 5,732,390 A | 3/1998 | Katayanagi et al. |
| 5,734,791 A | 3/1998 | Acero et al. |
| 5,737,734 A | 4/1998 | Schultz |
| 5,748,974 A | 5/1998 | Johnson |
| 5,749,081 A | 5/1998 | Whiteis |
| 5,759,101 A | 6/1998 | Von Kohorn |
| 5,790,978 A | 8/1998 | Olive et al. |
| 5,794,050 A | 8/1998 | Dahlgren et al. |
| 5,794,182 A | 8/1998 | Manduchi et al. |
| 5,794,207 A | 8/1998 | Walker et al. |
| 5,794,237 A | 8/1998 | Gore, Jr. |
| 5,799,276 A | 8/1998 | Komissarchik et al. |
| 5,822,743 A | 10/1998 | Gupta et al. |
| 5,825,881 A | 10/1998 | Colvin, Sr. |
| 5,826,261 A | 10/1998 | Spencer |
| 5,828,999 A | 10/1998 | Bellegarda et al. |
| 5,835,893 A | 11/1998 | Ushioda |
| 5,839,106 A | 11/1998 | Bellegarda |
| 5,845,255 A | 12/1998 | Mayaud |
| 5,857,184 A | 1/1999 | Lynch |
| 5,860,063 A | 1/1999 | Gorin et al. |
| 5,862,223 A | 1/1999 | Walker et al. |
| 5,864,806 A | 1/1999 | Mokbel et al. |
| 5,864,844 A | 1/1999 | James et al. |
| 5,867,799 A | 2/1999 | Lang et al. |
| 5,873,056 A | 2/1999 | Liddy et al. |

(56) References Cited

U.S. PATENT DOCUMENTS

| | | |
|---|---|---|
| 5,875,437 A | 2/1999 | Atkins |
| 5,884,323 A | 3/1999 | Hawkins et al. |
| 5,895,464 A | 4/1999 | Bhandari et al. |
| 5,895,466 A | 4/1999 | Goldberg et al. |
| 5,899,972 A | 5/1999 | Miyazawa et al. |
| 5,913,193 A | 6/1999 | Huang et al. |
| 5,915,249 A | 6/1999 | Spencer |
| 5,930,769 A | 7/1999 | Rose |
| 5,933,822 A | 8/1999 | Braden-Harder et al. |
| 5,936,926 A | 8/1999 | Yokouchi et al. |
| 5,940,811 A | 8/1999 | Norris |
| 5,941,944 A | 8/1999 | Messerly |
| 5,943,670 A | 8/1999 | Prager |
| 5,948,040 A | 9/1999 | DeLorme et al. |
| 5,956,699 A | 9/1999 | Wong et al. |
| 5,960,422 A | 9/1999 | Prasad |
| 5,963,924 A | 10/1999 | Williams et al. |
| 5,966,126 A | 10/1999 | Szabo |
| 5,970,474 A | 10/1999 | LeRoy et al. |
| 5,974,146 A | 10/1999 | Randle et al. |
| 5,982,891 A | 11/1999 | Ginter et al. |
| 5,987,132 A | 11/1999 | Rowney |
| 5,987,140 A | 11/1999 | Rowney et al. |
| 5,987,404 A | 11/1999 | Della Pietra et al. |
| 5,987,440 A | 11/1999 | O'Neil et al. |
| 5,999,908 A | 12/1999 | Abelow |
| 6,016,471 A | 1/2000 | Kuhn et al. |
| 6,023,684 A | 2/2000 | Pearson |
| 6,024,288 A | 2/2000 | Gottlich et al. |
| 6,026,345 A | 2/2000 | Shah et al. |
| 6,026,375 A | 2/2000 | Hall et al. |
| 6,026,388 A | 2/2000 | Liddy et al. |
| 6,026,393 A | 2/2000 | Gupta et al. |
| 6,029,132 A | 2/2000 | Kuhn et al. |
| 6,038,533 A | 3/2000 | Buchsbaum et al. |
| 6,052,656 A | 4/2000 | Suda et al. |
| 6,055,514 A | 4/2000 | Wren |
| 6,055,531 A | 4/2000 | Bennett et al. |
| 6,064,960 A | 5/2000 | Bellegarda et al. |
| 6,070,139 A | 5/2000 | Miyazawa et al. |
| 6,070,147 A | 5/2000 | Harms et al. |
| 6,076,051 A | 6/2000 | Messerly et al. |
| 6,076,088 A | 6/2000 | Paik et al. |
| 6,078,914 A | 6/2000 | Redfern |
| 6,081,750 A | 6/2000 | Hoffberg et al. |
| 6,081,774 A | 6/2000 | de Hita et al. |
| 6,088,731 A | 7/2000 | Kiraly et al. |
| 6,094,649 A | 7/2000 | Bowen et al. |
| 6,105,865 A | 8/2000 | Hardesty |
| 6,108,627 A | 8/2000 | Sabourin |
| 6,119,101 A | 9/2000 | Peckover |
| 6,122,616 A | 9/2000 | Henton |
| 6,125,356 A | 9/2000 | Brockman et al. |
| 6,144,938 A | 11/2000 | Surace et al. |
| 6,173,261 B1 | 1/2001 | Arai et al. |
| 6,173,279 B1 | 1/2001 | Levin et al. |
| 6,188,999 B1 | 2/2001 | Moody |
| 6,195,641 B1 | 2/2001 | Loring et al. |
| 6,205,456 B1 | 3/2001 | Nakao |
| 6,208,956 B1 * | 3/2001 | Motoyama ................ 704/2 |
| 6,208,971 B1 | 3/2001 | Bellegarda et al. |
| 6,233,545 B1 * | 5/2001 | Datig ................ 704/2 |
| 6,233,559 B1 | 5/2001 | Balakrishnan |
| 6,233,578 B1 | 5/2001 | Machihara et al. |
| 6,246,981 B1 | 6/2001 | Papineni et al. |
| 6,260,024 B1 | 7/2001 | Shkedy |
| 6,266,637 B1 | 7/2001 | Donovan et al. |
| 6,275,824 B1 | 8/2001 | O'Flaherty et al. |
| 6,285,786 B1 | 9/2001 | Seni et al. |
| 6,308,149 B1 | 10/2001 | Gaussier et al. |
| 6,311,189 B1 | 10/2001 | deVries et al. |
| 6,317,594 B1 | 11/2001 | Gossman et al. |
| 6,317,707 B1 | 11/2001 | Bangalore et al. |
| 6,317,831 B1 | 11/2001 | King |
| 6,321,092 B1 | 11/2001 | Fitch et al. |
| 6,334,103 B1 | 12/2001 | Surace et al. |
| 6,356,854 B1 | 3/2002 | Schubert et al. |
| 6,356,905 B1 | 3/2002 | Gershman et al. |
| 6,366,883 B1 | 4/2002 | Campbell et al. |
| 6,366,884 B1 | 4/2002 | Bellegarda et al. |
| 6,421,672 B1 | 7/2002 | McAllister et al. |
| 6,434,524 B1 | 8/2002 | Weber |
| 6,446,076 B1 | 9/2002 | Burkey et al. |
| 6,449,620 B1 | 9/2002 | Draper et al. |
| 6,453,292 B2 | 9/2002 | Ramaswamy et al. |
| 6,460,029 B1 | 10/2002 | Fries et al. |
| 6,466,654 B1 | 10/2002 | Cooper et al. |
| 6,477,488 B1 | 11/2002 | Bellegarda |
| 6,487,534 B1 | 11/2002 | Thelen et al. |
| 6,499,013 B1 | 12/2002 | Weber |
| 6,501,937 B1 | 12/2002 | Ho et al. |
| 6,505,158 B1 | 1/2003 | Conkie |
| 6,505,175 B1 | 1/2003 | Silverman et al. |
| 6,505,183 B1 | 1/2003 | Loofbourrow et al. |
| 6,510,417 B1 | 1/2003 | Woods et al. |
| 6,513,063 B1 | 1/2003 | Julia et al. |
| 6,523,061 B1 | 2/2003 | Halverson et al. |
| 6,523,172 B1 | 2/2003 | Martinez-Guerra et al. |
| 6,526,382 B1 | 2/2003 | Yuschik |
| 6,526,395 B1 | 2/2003 | Morris |
| 6,532,444 B1 | 3/2003 | Weber |
| 6,532,446 B1 | 3/2003 | King |
| 6,546,388 B1 | 4/2003 | Edlund et al. |
| 6,553,344 B2 | 4/2003 | Bellegarda et al. |
| 6,556,983 B1 | 4/2003 | Altschuler et al. |
| 6,584,464 B1 | 6/2003 | Warthen |
| 6,598,039 B1 | 7/2003 | Livowsky |
| 6,601,026 B2 | 7/2003 | Appelt et al. |
| 6,601,234 B1 | 7/2003 | Bowman-Amuah |
| 6,604,059 B2 | 8/2003 | Strubbe et al. |
| 6,615,172 B1 | 9/2003 | Bennett et al. |
| 6,615,175 B1 | 9/2003 | Gazdzinski |
| 6,615,220 B1 | 9/2003 | Austin et al. |
| 6,625,583 B1 | 9/2003 | Silverman et al. |
| 6,631,346 B1 | 10/2003 | Karaorman et al. |
| 6,633,846 B1 | 10/2003 | Bennett et al. |
| 6,647,260 B2 | 11/2003 | Dusse et al. |
| 6,650,735 B2 | 11/2003 | Burton et al. |
| 6,654,740 B2 | 11/2003 | Tokuda et al. |
| 6,665,639 B2 | 12/2003 | Mozer et al. |
| 6,665,640 B1 | 12/2003 | Bennett et al. |
| 6,665,641 B1 | 12/2003 | Coorman et al. |
| 6,684,187 B1 | 1/2004 | Conkie |
| 6,691,064 B2 | 2/2004 | Vroman |
| 6,691,111 B2 | 2/2004 | Lazaridis et al. |
| 6,691,151 B1 | 2/2004 | Cheyer et al. |
| 6,697,780 B1 | 2/2004 | Beutnagel et al. |
| 6,697,824 B1 | 2/2004 | Bowman-Amuah |
| 6,701,294 B1 | 3/2004 | Ball et al. |
| 6,711,585 B1 | 3/2004 | Copperman et al. |
| 6,718,324 B2 | 4/2004 | Edlund et al. |
| 6,721,728 B2 | 4/2004 | McGreevy |
| 6,735,632 B1 | 5/2004 | Kiraly et al. |
| 6,742,021 B1 | 5/2004 | Halverson et al. |
| 6,757,362 B1 | 6/2004 | Cooper et al. |
| 6,757,718 B1 | 6/2004 | Halverson et al. |
| 6,766,320 B1 | 7/2004 | Wang et al. |
| 6,778,951 B1 | 8/2004 | Contractor |
| 6,778,952 B2 | 8/2004 | Bellegarda |
| 6,778,962 B1 | 8/2004 | Kasai et al. |
| 6,778,970 B2 | 8/2004 | Au |
| 6,792,082 B1 | 9/2004 | Levine |
| 6,807,574 B1 | 10/2004 | Partovi et al. |
| 6,810,379 B1 | 10/2004 | Vermeulen et al. |
| 6,813,491 B1 | 11/2004 | McKinney |
| 6,829,603 B1 | 12/2004 | Chai et al. |
| 6,832,194 B1 | 12/2004 | Mozer et al. |
| 6,842,767 B1 | 1/2005 | Partovi et al. |
| 6,847,966 B1 | 1/2005 | Sommer et al. |
| 6,847,979 B2 | 1/2005 | Allemang et al. |
| 6,851,115 B1 | 2/2005 | Cheyer et al. |
| 6,859,931 B1 | 2/2005 | Cheyer et al. |
| 6,895,380 B2 | 5/2005 | Sepe, Jr. |
| 6,895,558 B1 | 5/2005 | Loveland |

(56) References Cited

U.S. PATENT DOCUMENTS

| | | | |
|---|---|---|---|
| 6,901,399 | B1 | 5/2005 | Corston et al. |
| 6,912,499 | B1 | 6/2005 | Sabourin et al. |
| 6,924,828 | B1 | 8/2005 | Hirsch |
| 6,928,614 | B1 | 8/2005 | Everhart |
| 6,931,384 | B1 | 8/2005 | Horvitz et al. |
| 6,937,975 | B1 | 8/2005 | Elworthy |
| 6,937,986 | B2 | 8/2005 | Denenberg et al. |
| 6,964,023 | B2 | 11/2005 | Maes et al. |
| 6,980,949 | B2 | 12/2005 | Ford |
| 6,980,955 | B2 | 12/2005 | Okutani et al. |
| 6,985,865 | B1 | 1/2006 | Packingham et al. |
| 6,988,071 | B1 | 1/2006 | Gazdzinski |
| 6,996,531 | B2 | 2/2006 | Korall et al. |
| 6,999,927 | B2 | 2/2006 | Mozer et al. |
| 7,020,685 | B1 | 3/2006 | Chen et al. |
| 7,027,974 | B1 | 4/2006 | Busch et al. |
| 7,036,128 | B1 | 4/2006 | Julia et al. |
| 7,050,977 | B1 | 5/2006 | Bennett |
| 7,058,569 | B2 | 6/2006 | Coorman et al. |
| 7,062,428 | B2 | 6/2006 | Hogenhout et al. |
| 7,069,560 | B1 | 6/2006 | Cheyer et al. |
| 7,092,887 | B2 | 8/2006 | Mozer et al. |
| 7,092,928 | B1 | 8/2006 | Elad et al. |
| 7,093,693 | B1 | 8/2006 | Gazdzinski |
| 7,107,204 | B1 * | 9/2006 | Liu et al. ............................ 704/2 |
| 7,127,046 | B1 | 10/2006 | Smith et al. |
| 7,127,403 | B1 | 10/2006 | Saylor et al. |
| 7,136,710 | B1 | 11/2006 | Hoffberg et al. |
| 7,137,126 | B1 | 11/2006 | Coffman et al. |
| 7,139,714 | B2 | 11/2006 | Bennett et al. |
| 7,139,722 | B2 | 11/2006 | Perrella et al. |
| 7,152,070 | B1 | 12/2006 | Musick et al. |
| 7,177,798 | B2 | 2/2007 | Hsu et al. |
| 7,197,460 | B1 | 3/2007 | Gupta et al. |
| 7,200,559 | B2 | 4/2007 | Wang |
| 7,203,646 | B2 | 4/2007 | Bennett |
| 7,216,073 | B2 | 5/2007 | Lavi et al. |
| 7,216,080 | B2 | 5/2007 | Tsiao et al. |
| 7,225,125 | B2 | 5/2007 | Bennett et al. |
| 7,233,790 | B2 | 6/2007 | Kjellberg et al. |
| 7,233,904 | B2 | 6/2007 | Luisi |
| 7,266,496 | B2 | 9/2007 | Wang et al. |
| 7,277,854 | B2 | 10/2007 | Bennett et al. |
| 7,290,039 | B1 | 10/2007 | Lisitsa et al. |
| 7,299,033 | B2 | 11/2007 | Kjellberg et al. |
| 7,310,600 | B1 | 12/2007 | Garner et al. |
| 7,324,947 | B2 | 1/2008 | Jordan et al. |
| 7,349,953 | B2 | 3/2008 | Lisitsa et al. |
| 7,376,556 | B2 | 5/2008 | Bennett |
| 7,376,645 | B2 | 5/2008 | Bernard |
| 7,379,874 | B2 | 5/2008 | Schmid et al. |
| 7,386,449 | B2 | 6/2008 | Sun et al. |
| 7,389,224 | B1 | 6/2008 | Elworthy |
| 7,392,185 | B2 | 6/2008 | Bennett |
| 7,398,209 | B2 | 7/2008 | Kennewick et al. |
| 7,403,938 | B2 | 7/2008 | Harrison et al. |
| 7,409,337 | B1 | 8/2008 | Potter et al. |
| 7,415,100 | B2 | 8/2008 | Cooper et al. |
| 7,418,392 | B1 | 8/2008 | Mozer et al. |
| 7,426,467 | B2 | 9/2008 | Nashida et al. |
| 7,427,024 | B1 | 9/2008 | Gazdzinski et al. |
| 7,447,635 | B1 | 11/2008 | Konopka et al. |
| 7,454,351 | B2 | 11/2008 | Jeschke et al. |
| 7,467,087 | B1 | 12/2008 | Gillick et al. |
| 7,475,010 | B2 | 1/2009 | Chao |
| 7,483,894 | B2 | 1/2009 | Cao |
| 7,487,089 | B2 | 2/2009 | Mozer |
| 7,496,498 | B2 | 2/2009 | Chu et al. |
| 7,496,512 | B2 | 2/2009 | Zhao et al. |
| 7,502,738 | B2 | 3/2009 | Kennewick et al. |
| 7,508,373 | B2 | 3/2009 | Lin et al. |
| 7,522,927 | B2 | 4/2009 | Fitch et al. |
| 7,523,108 | B2 | 4/2009 | Cao |
| 7,526,466 | B2 | 4/2009 | Au |
| 7,529,671 | B2 | 5/2009 | Rockenbeck et al. |
| 7,529,676 | B2 | 5/2009 | Koyama |
| 7,539,656 | B2 | 5/2009 | Fratkina et al. |
| 7,546,382 | B2 | 6/2009 | Healey et al. |
| 7,548,895 | B2 | 6/2009 | Pulsipher |
| 7,552,055 | B2 | 6/2009 | Lecoeuche |
| 7,555,431 | B2 | 6/2009 | Bennett |
| 7,558,730 | B2 | 7/2009 | Davis et al. |
| 7,571,106 | B2 | 8/2009 | Cao et al. |
| 7,599,918 | B2 | 10/2009 | Shen et al. |
| 7,620,549 | B2 | 11/2009 | Di Cristo et al. |
| 7,624,007 | B2 | 11/2009 | Bennett |
| 7,634,409 | B2 | 12/2009 | Kennewick et al. |
| 7,636,657 | B2 | 12/2009 | Ju et al. |
| 7,640,160 | B2 | 12/2009 | Di Cristo et al. |
| 7,647,225 | B2 | 1/2010 | Bennett et al. |
| 7,657,424 | B2 | 2/2010 | Bennett |
| 7,672,841 | B2 | 3/2010 | Bennett |
| 7,676,026 | B1 | 3/2010 | Baxter, Jr. |
| 7,684,985 | B2 | 3/2010 | Dominach et al. |
| 7,693,715 | B2 | 4/2010 | Hwang et al. |
| 7,693,720 | B2 | 4/2010 | Kennewick et al. |
| 7,698,131 | B2 | 4/2010 | Bennett |
| 7,702,500 | B2 | 4/2010 | Blaedow |
| 7,702,508 | B2 | 4/2010 | Bennett |
| 7,707,027 | B2 | 4/2010 | Balchandran et al. |
| 7,707,032 | B2 | 4/2010 | Wang et al. |
| 7,707,267 | B2 | 4/2010 | Lisitsa et al. |
| 7,711,565 | B1 | 5/2010 | Gazdzinski |
| 7,711,672 | B2 | 5/2010 | Au |
| 7,716,056 | B2 | 5/2010 | Weng et al. |
| 7,720,674 | B2 | 5/2010 | Kaiser et al. |
| 7,720,683 | B1 | 5/2010 | Vermeulen et al. |
| 7,725,307 | B2 | 5/2010 | Bennett |
| 7,725,318 | B2 | 5/2010 | Gavalda et al. |
| 7,725,320 | B2 | 5/2010 | Bennett |
| 7,725,321 | B2 | 5/2010 | Bennett |
| 7,729,904 | B2 | 6/2010 | Bennett |
| 7,729,916 | B2 | 6/2010 | Coffman et al. |
| 7,734,461 | B2 | 6/2010 | Kwak et al. |
| 7,747,616 | B2 | 6/2010 | Yamada et al. |
| 7,752,152 | B2 | 7/2010 | Paek et al. |
| 7,756,868 | B2 | 7/2010 | Lee |
| 7,774,204 | B2 | 8/2010 | Mozer et al. |
| 7,783,486 | B2 | 8/2010 | Rosser et al. |
| 7,801,729 | B2 | 9/2010 | Mozer |
| 7,809,570 | B2 | 10/2010 | Kennewick et al. |
| 7,809,610 | B2 | 10/2010 | Cao |
| 7,818,176 | B2 | 10/2010 | Freeman et al. |
| 7,822,608 | B2 | 10/2010 | Cross, Jr. et al. |
| 7,826,945 | B2 | 11/2010 | Zhang et al. |
| 7,831,426 | B2 | 11/2010 | Bennett |
| 7,840,400 | B2 | 11/2010 | Lavi et al. |
| 7,840,447 | B2 | 11/2010 | Kleinrock et al. |
| 7,853,444 | B2 * | 12/2010 | Wang et al. ...................... 704/2 |
| 7,853,574 | B2 | 12/2010 | Kraenzel et al. |
| 7,873,519 | B2 | 1/2011 | Bennett |
| 7,873,654 | B2 | 1/2011 | Bernard |
| 7,881,936 | B2 | 2/2011 | Longé et al. |
| 7,890,652 | B2 | 2/2011 | Bull et al. |
| 7,912,702 | B2 | 3/2011 | Bennett |
| 7,917,367 | B2 | 3/2011 | Di Cristo et al. |
| 7,917,497 | B2 | 3/2011 | Harrison et al. |
| 7,920,678 | B2 | 4/2011 | Cooper et al. |
| 7,925,525 | B2 | 4/2011 | Chin |
| 7,930,168 | B2 | 4/2011 | Weng et al. |
| 7,949,529 | B2 | 5/2011 | Weider et al. |
| 7,949,534 | B2 | 5/2011 | Davis et al. |
| 7,974,844 | B2 | 7/2011 | Sumita |
| 7,974,972 | B2 | 7/2011 | Cao |
| 7,983,915 | B2 | 7/2011 | Knight et al. |
| 7,983,917 | B2 | 7/2011 | Kennewick et al. |
| 7,983,997 | B2 | 7/2011 | Allen et al. |
| 7,986,431 | B2 | 7/2011 | Emori et al. |
| 7,987,151 | B2 | 7/2011 | Schott et al. |
| 7,996,228 | B2 | 8/2011 | Miller et al. |
| 8,000,453 | B2 | 8/2011 | Cooper et al. |
| 8,005,679 | B2 | 8/2011 | Jordan et al. |
| 8,015,006 | B2 | 9/2011 | Kennewick et al. |
| 8,024,195 | B2 | 9/2011 | Mozer et al. |

(56) References Cited

U.S. PATENT DOCUMENTS

| | | |
|---|---|---|
| 8,036,901 B2 | 10/2011 | Mozer |
| 8,041,570 B2 | 10/2011 | Mirkovic et al. |
| 8,041,611 B2 | 10/2011 | Kleinrock et al. |
| 8,055,708 B2 | 11/2011 | Chitsaz et al. |
| 8,065,155 B1 | 11/2011 | Gazdzinski |
| 8,065,156 B2 | 11/2011 | Gazdzinski |
| 8,069,046 B2 | 11/2011 | Kennewick et al. |
| 8,073,681 B2 | 12/2011 | Baldwin et al. |
| 8,078,473 B1 | 12/2011 | Gazdzinski |
| 8,082,153 B2 | 12/2011 | Coffman et al. |
| 8,095,364 B2 | 1/2012 | Longé et al. |
| 8,099,289 B2 | 1/2012 | Mozer et al. |
| 8,107,401 B2 | 1/2012 | John et al. |
| 8,112,275 B2 | 2/2012 | Kennewick et al. |
| 8,112,280 B2 | 2/2012 | Lu |
| 8,117,037 B2 | 2/2012 | Gazdzinski |
| 8,131,557 B2 | 3/2012 | Davis et al. |
| 8,140,335 B2 | 3/2012 | Kennewick et al. |
| 8,165,886 B1 | 4/2012 | Gagnon et al. |
| 8,166,019 B1 | 4/2012 | Lee et al. |
| 8,190,359 B2 | 5/2012 | Bourne |
| 8,195,467 B2 | 6/2012 | Mozer et al. |
| 8,204,238 B2 | 6/2012 | Mozer |
| 8,205,788 B1 | 6/2012 | Gazdzinski et al. |
| 8,219,407 B1 | 7/2012 | Roy et al. |
| 8,285,551 B2 | 10/2012 | Gazdzinski |
| 8,285,553 B2 | 10/2012 | Gazdzinski |
| 8,290,778 B2 | 10/2012 | Gazdzinski |
| 8,290,781 B2 | 10/2012 | Gazdzinski |
| 8,296,146 B2 | 10/2012 | Gazdzinski |
| 8,296,153 B2 | 10/2012 | Gazdzinski |
| 8,301,456 B2 | 10/2012 | Gazdzinski |
| 8,311,834 B1 | 11/2012 | Gazdzinski |
| 8,370,158 B2 | 2/2013 | Gazdzinski |
| 8,371,503 B2 | 2/2013 | Gazdzinski |
| 8,374,871 B2 | 2/2013 | Ehsani et al. |
| 8,447,612 B2 | 5/2013 | Gazdzinski |
| 2001/0047264 A1 | 11/2001 | Roundtree |
| 2002/0032564 A1 | 3/2002 | Ehsani et al. |
| 2002/0046025 A1 | 4/2002 | Hain |
| 2002/0069063 A1 | 6/2002 | Buchner et al. |
| 2002/0077817 A1 | 6/2002 | Atal |
| 2002/0103641 A1 | 8/2002 | Kuo et al. |
| 2002/0164000 A1 | 11/2002 | Cohen et al. |
| 2002/0198714 A1 | 12/2002 | Zhou |
| 2004/0135701 A1 | 7/2004 | Yasuda et al. |
| 2004/0186714 A1* | 9/2004 | Baker ............... 704/236 |
| 2004/0236778 A1 | 11/2004 | Junqua et al. |
| 2005/0055403 A1 | 3/2005 | Brittan |
| 2005/0071332 A1 | 3/2005 | Ortega et al. |
| 2005/0080625 A1 | 4/2005 | Bennett et al. |
| 2005/0091118 A1 | 4/2005 | Fano |
| 2005/0102614 A1 | 5/2005 | Brockett et al. |
| 2005/0108001 A1 | 5/2005 | Aarskog |
| 2005/0114124 A1 | 5/2005 | Liu et al. |
| 2005/0119897 A1 | 6/2005 | Bennett et al. |
| 2005/0143972 A1 | 6/2005 | Gopalakrishnan et al. |
| 2005/0165607 A1 | 7/2005 | DiFabbrizio et al. |
| 2005/0182629 A1 | 8/2005 | Coorman et al. |
| 2005/0196733 A1 | 9/2005 | Budra et al. |
| 2005/0288936 A1 | 12/2005 | Busayapongchai et al. |
| 2005/0289463 A1* | 12/2005 | Wu et al. ............. 715/533 |
| 2006/0018492 A1 | 1/2006 | Chiu et al. |
| 2006/0106592 A1 | 5/2006 | Brockett et al. |
| 2006/0106594 A1 | 5/2006 | Brockett et al. |
| 2006/0106595 A1 | 5/2006 | Brockett et al. |
| 2006/0117002 A1 | 6/2006 | Swen |
| 2006/0122834 A1 | 6/2006 | Bennett |
| 2006/0143007 A1 | 6/2006 | Koh et al. |
| 2007/0055529 A1 | 3/2007 | Kanevsky et al. |
| 2007/0058832 A1 | 3/2007 | Hug et al. |
| 2007/0088556 A1 | 4/2007 | Andrew |
| 2007/0100790 A1 | 5/2007 | Cheyer et al. |
| 2007/0106674 A1 | 5/2007 | Agrawal et al. |
| 2007/0118377 A1 | 5/2007 | Badino et al. |
| 2007/0135949 A1 | 6/2007 | Snover et al. |
| 2007/0174188 A1 | 7/2007 | Fish |
| 2007/0185917 A1 | 8/2007 | Prahlad et al. |
| 2007/0208569 A1* | 9/2007 | Subramanian et al. ....... 704/270 |
| 2007/0225980 A1* | 9/2007 | Sumita ............... 704/240 |
| 2007/0282595 A1 | 12/2007 | Tunning et al. |
| 2008/0015864 A1 | 1/2008 | Ross et al. |
| 2008/0021708 A1 | 1/2008 | Bennett et al. |
| 2008/0034032 A1 | 2/2008 | Healey et al. |
| 2008/0052063 A1 | 2/2008 | Bennett et al. |
| 2008/0120112 A1 | 5/2008 | Jordan et al. |
| 2008/0129520 A1 | 6/2008 | Lee |
| 2008/0140657 A1 | 6/2008 | Azvine et al. |
| 2008/0221903 A1 | 9/2008 | Kanevsky et al. |
| 2008/0228463 A1* | 9/2008 | Mori et al. ............. 704/2 |
| 2008/0228496 A1 | 9/2008 | Yu et al. |
| 2008/0247519 A1 | 10/2008 | Abella et al. |
| 2008/0249770 A1 | 10/2008 | Kim et al. |
| 2008/0270118 A1* | 10/2008 | Kuo et al. ............. 704/9 |
| 2008/0300878 A1 | 12/2008 | Bennett |
| 2008/0319763 A1 | 12/2008 | Di Fabbrizio et al. |
| 2009/0006100 A1 | 1/2009 | Badger et al. |
| 2009/0006343 A1 | 1/2009 | Platt et al. |
| 2009/0030800 A1 | 1/2009 | Grois |
| 2009/0055179 A1 | 2/2009 | Cho et al. |
| 2009/0058823 A1 | 3/2009 | Kocienda |
| 2009/0070097 A1* | 3/2009 | Wu et al. ............. 704/2 |
| 2009/0076792 A1* | 3/2009 | Lawson-Tancred ....... 704/2 |
| 2009/0076796 A1 | 3/2009 | Daraselia |
| 2009/0077165 A1 | 3/2009 | Rhodes et al. |
| 2009/0100049 A1 | 4/2009 | Cao |
| 2009/0112677 A1 | 4/2009 | Rhett |
| 2009/0125477 A1* | 5/2009 | Lu et al. ............. 707/1 |
| 2009/0150156 A1 | 6/2009 | Kennewick et al. |
| 2009/0157401 A1 | 6/2009 | Bennett |
| 2009/0164441 A1 | 6/2009 | Cheyer |
| 2009/0171664 A1 | 7/2009 | Kennewick et al. |
| 2009/0192782 A1* | 7/2009 | Drewes .............. 704/3 |
| 2009/0287583 A1 | 11/2009 | Holmes |
| 2009/0290718 A1 | 11/2009 | Kahn et al. |
| 2009/0299745 A1 | 12/2009 | Kennewick et al. |
| 2009/0299849 A1 | 12/2009 | Cao et al. |
| 2009/0307162 A1 | 12/2009 | Bui et al. |
| 2010/0005081 A1 | 1/2010 | Bennett |
| 2010/0023320 A1 | 1/2010 | Di Cristo et al. |
| 2010/0036660 A1 | 2/2010 | Bennett |
| 2010/0042400 A1 | 2/2010 | Block et al. |
| 2010/0088020 A1 | 4/2010 | Sano et al. |
| 2010/0100384 A1* | 4/2010 | Ju et al. ............... 704/257 |
| 2010/0138215 A1 | 6/2010 | Williams |
| 2010/0145700 A1 | 6/2010 | Kennewick et al. |
| 2010/0204986 A1 | 8/2010 | Kennewick et al. |
| 2010/0217604 A1 | 8/2010 | Baldwin et al. |
| 2010/0228540 A1 | 9/2010 | Bennett |
| 2010/0235341 A1 | 9/2010 | Bennett |
| 2010/0257160 A1 | 10/2010 | Cao |
| 2010/0262599 A1 | 10/2010 | Nitz |
| 2010/0277579 A1 | 11/2010 | Cho et al. |
| 2010/0280983 A1 | 11/2010 | Cho et al. |
| 2010/0286985 A1 | 11/2010 | Kennewick et al. |
| 2010/0299142 A1 | 11/2010 | Freeman et al. |
| 2010/0312547 A1 | 12/2010 | van Os et al. |
| 2010/0318576 A1 | 12/2010 | Kim |
| 2010/0332235 A1 | 12/2010 | David |
| 2010/0332348 A1 | 12/2010 | Cao |
| 2011/0010178 A1* | 1/2011 | Lee et al. ............. 704/260 |
| 2011/0022952 A1* | 1/2011 | Wu et al. ............. 715/257 |
| 2011/0047072 A1 | 2/2011 | Ciurea |
| 2011/0060807 A1 | 3/2011 | Martin et al. |
| 2011/0082688 A1 | 4/2011 | Kim et al. |
| 2011/0112827 A1 | 5/2011 | Kennewick et al. |
| 2011/0112921 A1 | 5/2011 | Kennewick et al. |
| 2011/0119049 A1 | 5/2011 | Ylonen |
| 2011/0125540 A1 | 5/2011 | Jang et al. |
| 2011/0130958 A1 | 6/2011 | Stahl et al. |
| 2011/0131036 A1 | 6/2011 | Di Cristo et al. |
| 2011/0131045 A1 | 6/2011 | Cristo et al. |
| 2011/0143811 A1 | 6/2011 | Rodriguez |
| 2011/0144999 A1 | 6/2011 | Jang et al. |

(56) References Cited

U.S. PATENT DOCUMENTS

| | | |
|---|---|---|
| 2011/0161076 A1 | 6/2011 | Davis et al. |
| 2011/0161309 A1 | 6/2011 | Lung et al. |
| 2011/0175810 A1 | 7/2011 | Markovic et al. |
| 2011/0184721 A1* | 7/2011 | Subramanian et al. ........... 704/4 |
| 2011/0184730 A1 | 7/2011 | LeBeau et al. |
| 2011/0218855 A1 | 9/2011 | Cao et al. |
| 2011/0231182 A1 | 9/2011 | Weider et al. |
| 2011/0231188 A1 | 9/2011 | Kennewick et al. |
| 2011/0264643 A1 | 10/2011 | Cao |
| 2011/0279368 A1 | 11/2011 | Klein et al. |
| 2011/0306426 A1 | 12/2011 | Novak et al. |
| 2012/0002820 A1 | 1/2012 | Leichter |
| 2012/0016678 A1 | 1/2012 | Gruber et al. |
| 2012/0020490 A1 | 1/2012 | Leichter |
| 2012/0022787 A1 | 1/2012 | LeBeau et al. |
| 2012/0022857 A1 | 1/2012 | Baldwin et al. |
| 2012/0022860 A1 | 1/2012 | Lloyd et al. |
| 2012/0022868 A1 | 1/2012 | LeBeau et al. |
| 2012/0022869 A1 | 1/2012 | Lloyd et al. |
| 2012/0022870 A1 | 1/2012 | Kristjansson et al. |
| 2012/0022874 A1 | 1/2012 | Lloyd et al. |
| 2012/0022876 A1 | 1/2012 | LeBeau et al. |
| 2012/0023088 A1 | 1/2012 | Cheng et al. |
| 2012/0034904 A1 | 2/2012 | LeBeau et al. |
| 2012/0035908 A1 | 2/2012 | LeBeau et al. |
| 2012/0035924 A1 | 2/2012 | Jitkoff et al. |
| 2012/0035931 A1 | 2/2012 | LeBeau et al. |
| 2012/0035932 A1* | 2/2012 | Jitkoff et al. ................. 704/254 |
| 2012/0042343 A1 | 2/2012 | Laligand et al. |
| 2012/0137367 A1 | 5/2012 | Dupont et al. |
| 2012/0173464 A1 | 7/2012 | Tur et al. |
| 2012/0221339 A1* | 8/2012 | Wang et al. ................... 704/260 |
| 2012/0265528 A1 | 10/2012 | Gruber et al. |
| 2012/0271635 A1* | 10/2012 | Ljolje ........................... 704/254 |
| 2012/0271676 A1 | 10/2012 | Aravamudan et al. |
| 2012/0311583 A1 | 12/2012 | Gruber et al. |
| 2013/0110518 A1 | 5/2013 | Gruber et al. |
| 2013/0110520 A1 | 5/2013 | Cheyer et al. |

FOREIGN PATENT DOCUMENTS

| | | |
|---|---|---|
| DE | 198 41 541 B4 | 12/2007 |
| EP | 0138061 B1 | 9/1984 |
| EP | 0138061 A1 | 4/1985 |
| EP | 0218859 A2 | 4/1987 |
| EP | 0262938 A1 | 4/1988 |
| EP | 0293259 A2 | 11/1988 |
| EP | 0299572 A2 | 1/1989 |
| EP | 0313975 A2 | 5/1989 |
| EP | 0314908 A2 | 5/1989 |
| EP | 0327408 A2 | 8/1989 |
| EP | 0389271 A2 | 9/1990 |
| EP | 0411675 A2 | 2/1991 |
| EP | 0559349 A1 | 9/1993 |
| EP | 0559349 B1 | 9/1993 |
| EP | 0570660 A1 | 11/1993 |
| EP | 0863453 A1 | 9/1998 |
| EP | 1245023 A1 | 10/2002 |
| EP | 2 109 295 A1 | 10/2009 |
| GB | 2293667 A | 4/1996 |
| JP | 06 019965 | 1/1994 |
| JP | 2001 125896 | 5/2001 |
| JP | 2002-014954 A | 1/2002 |
| JP | 2002 024212 | 1/2002 |
| JP | 2003517158 A | 5/2003 |
| JP | 2007-004633 A | 1/2007 |
| JP | 2009 036999 | 2/2009 |
| JP | 2009-294913 A | 12/2009 |
| KR | 10-2007-0057496 | 6/2007 |
| KR | 10-0776800 B1 | 11/2007 |
| KR | 10-2008-001227 | 2/2008 |
| KR | 10-0810500 B1 | 3/2008 |
| KR | 10 2008 109322 A | 12/2008 |
| KR | 10 2009 086805 A | 8/2009 |
| KR | 10-0920267 B1 | 10/2009 |
| KR | 10-2010-0032792 | 4/2010 |
| KR | 10 2011 0113414 A | 10/2011 |
| WO | WO 95/02221 | 1/1995 |
| WO | WO 97/26612 | 7/1997 |
| WO | WO 98/41956 | 9/1998 |
| WO | WO 99/01834 | 1/1999 |
| WO | WO 99/08238 | 2/1999 |
| WO | WO 99/56227 | 11/1999 |
| WO | WO 00/60435 | 10/2000 |
| WO | WO 00/60435 A3 | 10/2000 |
| WO | WO 02/073603 A1 | 9/2002 |
| WO | WO 2006/129967 A1 | 12/2006 |
| WO | WO 2008/085742 A2 | 7/2008 |
| WO | WO 2008/109835 A2 | 9/2008 |
| WO | WO 2011/088053 A2 | 7/2011 |

OTHER PUBLICATIONS

Cheyer, A., "About Adam Cheyer," Sep. 17, 2012, http://www.adam.cheyer.com/about.html, 2 pages.

Cheyer, A., "A Perspective on AI & Agent Technologies for SCM," VerticalNet, 2001 presentation, 22 pages.

Domingue, J., et al., "Web Service Modeling Ontology (WSMO)—An Ontology for Semantic Web Services," Jun. 9-10, 2005, position paper at the W3C Workshop on Frameworks for Semantics in Web Services, Innsbruck, Austria, 6 pages.

Guzzoni, D., et al., "A Unified Platform for Building Intelligent Web Interaction Assistants," Proceedings of the 2006 IEEE/WIC/ACM International Conference on Web Intelligence and Intelligent Agent Technology, Computer Society, 4 pages.

Roddy, D., et al., "Communication and Collaboration in a Landscape of B2B eMarketplaces," VerticalNet Solutions, white paper, Jun. 15, 2000, 23 pages.

Alfred App, 2011, http://www.alfredapp.com/, 5 pages.

Ambite, JL., et al., "Design and Implementation of the CALO Query Manager," Copyright © 2006, American Association for Artificial Intelligence, (www.aaai.org), 8 pages.

Ambite, JL., et al., "Integration of Heterogeneous Knowledge Sources in the CALO Query Manager," 2005, The 4th International Conference on Ontologies, DataBases, and Applications of Semantics (ODBASE), Agia Napa, Cyprus, ttp://www.isi.edu/people/ambite/publications/integration_heterogeneous_knowledge_sources_calo_query_manager, 18 pages.

Belvin, R. et al., "Development of the HRL Route Navigation Dialogue System," 2001, In Proceedings of the First International Conference on Human Language Technology Research, Paper, Copyright © 2001 HRL Laboratories, LLC, http://citeseerx.ist.psu.edu/viewdoc/summary?doi=10.1.1.10.6538, 5 pages.

Berry, P. M., et al. "PTIME: Personalized Assistance for Calendaring," ACM Transactions on Intelligent Systems and Technology, vol. 2, No. 4, Article 40, Publication date: Jul. 2011, 40:1-22, 22 pages.

Butcher, M., "EVI arrives in town to go toe-to-toe with Siri," Jan. 23, 2012, http://techcrunch.com/2012/01/23/evi-arrives-in-town-to-go-toe-to-toe-with-siri/, 2 pages.

Chen, Y., "Multimedia Siri Finds and Plays Whatever You Ask for," Feb. 9, 2012, http://www.psfk.com/2012/02/multimedia-siri.html, 9 pages.

Cheyer, A. et al., "Spoken Language and Multimodal Applications for Electronic Realties," © Springer-Verlag London Ltd, Virtual Reality 1999, 3:1-15, 15 pages.

Cutkosky, M. R. et al., "PACT: An Experiment in Integrating Concurrent Engineering Systems," Journal, Computer, vol. 26 Issue 1, Jan. 1993, IEEE Computer Society Press Los Alamitos, CA, USA, http://dl.acm.org/citation.cfm?id=165320, 14 pages.

Elio, R. et al., "On Abstract Task Models and Conversation Policies," http://webdocs.cs.ualberta.ca/~ree/publications/papers2/ATS.AA99.pdf, 10 pages.

Ericsson, S. et al., "Software illustrating a unified approach to multimodality and multilinguality in the in-home domain," Dec. 22, 2006, Talk and Look: Tools for Ambient Linguistic Knowledge, http://www.talk-project.eurice.eu/fileadmin/talk/publications_public/deliverables_public/D1_6.pdf, 127 pages.

(56) References Cited

OTHER PUBLICATIONS

Evi, "Meet Evi: the one mobile app that provides solutions for your everyday problems," Feb. 8, 2012, http://www.evi.com/, 3 pages.

Feigenbaum, E., et al., "Computer-assisted Semantic Annotation of Scientific Life Works," 2007, http://tomgruber.org/writing/stanford-cs300.pdf, 22 pages.

Gannes, L., "Alfred App Gives Personalized Restaurant Recommendations," allthingsd.com, Jul. 18, 2011, http://allthingsd.com/20110718/alfred-app-gives-personalized-restaurant-recommendations/, 3 pages.

Gautier, P. O., et al. "Generating Explanations of Device Behavior Using Compositional Modeling and Causal Ordering," 1993, http://citeseerx.ist.psu.edu/viewdoc/summary?doi=10.1.1.42.8394, 9 pages.

Gervasio, M. T., et al., Active Preference Learning for Personalized Calendar Scheduling Assistancae, Copyright © 2005, http://www.ai.sri.com/~gervasio/pubs/gervasio-iui05.pdf, 8 pages.

Glass, A., "Explaining Preference Learning," 2006, http://cs229.stanford.edu/proj2006/Glass-ExplainingPreferenceLearning.pdf, 5 pages.

Gruber, T. R., et al., "An Ontology for Engineering Mathematics," In Jon Doyle, Piero Torasso, & Erik Sandewall, Eds., Fourth International Conference on Principles of Knowledge Representation and Reasoning, Gustav Stresemann Institut, Bonn, Germany, Morgan Kaufmann, 1994, http://www-ksl.stanford.edu/knowledge-sharing/papers/engmath.html, 22 pages.

Gruber, T. R., "A Translation Approach to Portable Ontology Specifications," Knowledge Systems Laboratory, Stanford University, Sep. 1992, Technical Report KSL 92-71, Revised Apr. 1993, 27 pages.

Gruber, T. R., "Automated Knowledge Acquisition for Strategic Knowledge," Knowledge Systems Laboratory, Machine Learning, 4, 293-336 (1989), 44 pages.

Gruber, T. R., "(Avoiding) the Travesty of the Commons," Presentation at NPUC 2006, New Paradigms for User Computing, IBM Almaden Research Center, Jul. 24, 2006. http://tomgruber.org/writing/avoiding-travestry.htm, 52 pages.

Gruber, T. R., "Big Think Small Screen: How semantic computing in the cloud will revolutionize the consumer experience on the phone," Keynote presentation at Web 3.0 conference, Jan. 27, 2010, http://tomgruber.org/writing/web30jan2010.htm, 41 pages.

Gruber, T. R., "Collaborating around Shared Content on the WWW," W3C Workshop on WWW and Collaboration, Cambridge, MA, Sep. 11, 1995, http://www.w3.org/Collaboration/Workshop/Proceedings/P9.html, 1 page.

Gruber, T. R., "Collective Knowledge Systems: Where the Social Web meets the Semantic Web," Web Semantics: Science, Services and Agents on the World Wide Web (2007), doi:10.1016/j.websem.2007.11.011, keynote presentation given at the 5th International Semantic Web Conference, Nov. 7, 2006, 19 pages.

Gruber, T. R., "Where the Social Web meets the Semantic Web," Presentation at the 5th International Semantic Web Conference, Nov. 7, 2006, 38 pages.

Gruber, T. R., "Despite our Best Efforts, Ontologies are not the Problem," AAAI Spring Symposium, Mar. 2008, http://tomgruber.org/writing/aaai-ss08.htm, 40 pages.

Gruber, T. R., "Enterprise Collaboration Management with Intraspect," Intraspect Software, Inc., Instraspect Technical White Paper Jul. 2001, 24 pages.

Gruber, T. R., "Every ontology is a treaty—a social agreement—among people with some common motive in sharing," Interview by Dr. Miltiadis D. Lytras, Official Quarterly Bulletin of AIS Special Interest Group on Semantic Web and Information Systems, vol. 1, Issue 3, 2004, http://www.sigsemis.org 1, 5 pages.

Gruber, T. R., et al., "Generative Design Rationale: Beyond the Record and Replay Paradigm," Knowledge Systems Laboratory, Stanford University, Dec. 1991, Technical Report KSL 92-59, Updated Feb. 1993, 24 pages.

Gruber, T. R., "Helping Organizations Collaborate, Communicate, and Learn," Presentation to NASA Ames Research, Mountain View, CA, Mar. 2003, http://tomgruber.org/writing/organizational-intelligence-talk.htm, 30 pages.

Gruber, T. R., "Intelligence at the Interface: Semantic Technology and the Consumer Internet Experience," Presentation at Semantic Technologies conference (SemTech08), May 20, 2008, http://tomgruber.org/writing.htm, 40 pages.

Gruber, T. R., Interactive Acquisition of Justifications: Learning "Why" by Being Told "What" Knowledge Systems Laboratory, Stanford University, Oct. 1990, Technical Report KSL 91-17, Revised Feb. 1991, 24 pages.

Gruber, T. R., "It is What It Does: The Pragmatics of Ontology for Knowledge Sharing," (c) 2000, 2003, http://www.cidoc-crm.org/docs/symposium_presentations/gruber_cidoc-ontology-2003.pdf, 21 pages.

Gruber, T. R., et al., "Machine-generated Explanations of Engineering Models: A Compositional Modeling Approach," (1993) In Proc. International Joint Conference on Artificial Intelligence, http://citeseerx.ist.psu.edu/viewdoc/summary?doi=10.1.1.34.930, 7 pages.

Gruber, T. R., "2021: Mass Collaboration and the Really New Economy," TNTY Futures, the newsletter of The Next Twenty Years series, vol. 1, Issue 6, Aug. 2001, http://www.tnty.com/newsletter/futures/archive/v01-05business.html, 5 pages.

Gruber, T. R., et al.,"Nike: A National Infrastructure for Knowledge Exchange," Oct. 1994, http://www.eit.com/papers/nike/nike.html and nike.ps, 10 pages.

Gruber, T. R., "Ontologies, Web 2.0 and Beyond," Apr. 24, 2007, Ontology Summit 2007, http://tomgruber.org/writing/ontolog-social-web-keynote.pdf, 17 pages.

Gruber, T. R., "Ontology of Folksonomy: A Mash-up of Apples and Oranges," Originally published to the web in 2005, Int'l Journal on Semantic Web & Information Systems, 3(2), 2007, 7 pages.

Gruber, T. R., "Siri, a Virtual Personal Assistant—Bringing Intelligence to the Interface," Jun. 16, 2009, Keynote presentation at Semantic Technologies conference, Jun. 2009. http://tomgruber.org/writing/semtech09.htm, 22 pages.

Gruber, T. R., "TagOntology," Presentation to Tag Camp, www.tagcamp.org, Oct. 29, 2005, 20 pages.

Gruber, T. R., et al., "Toward a Knowledge Medium for Collaborative Product Development," In Artificial Intelligence in Design 1992, from Proceedings of the Second International Conference on Artificial Intelligence in Design, Pittsburgh, USA, Jun. 22-25, 1992, 19 pages.

Gruber, T. R., "Toward Principles for the Design of Ontologies Used for Knowledge Sharing," In International Journal Human-Computer Studies 43, p. 907-928, substantial revision of paper presented at the International Workshop on Formal Ontology, Mar. 1993, Padova, Italy, available as Technical Report KSL 93-04, Knowledge Systems Laboratory, Stanford University, further revised Aug. 23, 1993, 23 pages.

Guzzoni, D., et al., "Active, A Platform for Building Intelligent Operating Rooms," Surgetica 2007 Computer-Aided Medical Interventions: tools and applications, pp. 191-198, Paris, 2007, Sauramps Médical, http://lsro.epfl.ch/page-68384-en.html, 8 pages.

Guzzoni, D., et al., "Active, A Tool for Building Intelligent User Interfaces," ASC 2007, Palma de Mallorca, http://lsro.epfl.ch/page-34241.html, 6 pages.

Guzzoni, D., et al., "Modeling Human-Agent Interaction with Active Ontologies," 2007, AAAI Spring Symposium, Interaction Challenges for Intelligent Assistants, Stanford University, Palo Alto, California, 8 pages.

Hardawar, D., "Driving app Waze builds its own Siri for hands-free voice control," Feb. 9, 2012, http://venturebeat.com/2012/02/09/driving-app-waze-builds-its-own-siri-for-hands-free-voice-control/, 4 pages.

Intraspect Software, "The Intraspect Knowledge Management Solution: Technical Overview," http://tomgruber.org/writing/intraspect-whitepaper-1998.pdf, 18 pages.

(56) References Cited

OTHER PUBLICATIONS

Julia, L., et al., Un éditeur interactif de tableaux dessinés à main levée (An Interactive Editor for Hand-Sketched Tables), Traitement du Signal 1995, vol. 12, No. 6, 8 pages. No English Translation Available.

Karp, P. D., "A Generic Knowledge-Base Access Protocol," May 12, 1994, http://lecture.cs.buu.ac.th/~f50353/Document/gfp.pdf, 66 pages.

Lemon, O., et al., "Multithreaded Context for Robust Conversational Interfaces: Context-Sensitive Speech Recognition and Interpretation of Corrective Fragments," Sep. 2004, ACM Transactions on Computer-Human Interaction, vol. 11, No. 3, 27 pages.

Leong, L., et al., "CASIS: A Context-Aware Speech Interface System," IUI'05, Jan. 9-12, 2005, Proceedings of the 10th international conference on Intelligent user interfaces, San Diego, California, USA, 8 pages.

Lieberman, H., et al., "Out of context: Computer systems that adapt to, and learn from, context," 2000, IBM Systems Journal, vol. 39, Nos. 3/4, 2000, 16 pages.

Lin, B., et al., "A Distributed Architecture for Cooperative Spoken Dialogue Agents with Coherent Dialogue State and History," 1999, http://citeseerx.ist.psu.edu/viewdoc/summary?doi=10.1.1.42.272, 4 pages.

McGuire, J., et al., "SHADE: Technology for Knowledge-Based Collaborative Engineering," 1993, Journal of Concurrent Engineering: Applications and Research (CERA), 18 pages.

Milward, D., et al., "D2.2: Dynamic Multimodal Interface Reconfiguration, Talk and Look: Tools for Ambient Linguistic Knowledge," Aug. 8, 2006, http://www.ihmc.us/users/nblaylock/Pubs/Files/talk_d2.2.pdf, 69 pages.

Mitra, P., et al., "A Graph-Oriented Model for Articulation of Ontology Interdependencies," 2000, http://ilpubs.stanford.edu:8090/442/1/2000-20.pdf, 15 pages.

Moran, D. B., et al., "Multimodal User Interfaces in the Open Agent Architecture," Proc. of the 1997 International Conference on Intelligent User Interfaces (IUI97), 8 pages.

Mozer, M., "An Intelligent Environment Must be Adaptive," Mar./Apr. 1999, IEEE Intelligent Systems, 3 pages.

Mühlhäuser, M., "Context Aware Voice User Interfaces for Workflow Support," Darmstadt 2007, http://tuprints.ulb.tu-darmstadt.de/876/1/PhD.pdf, 254 pages.

Naone, E., "TR10: Intelligent Software Assistant," Mar.-Apr. 2009, Technology Review, http://www.technologyreview.com/printer_friendly_article.aspx?id=22117, 2 pages.

Neches, R., "Enabling Technology for Knowledge Sharing," Fall 1991, AI Magazine, pp. 37-56, (21 pages).

Nöth, E., et al., "Verbmobil: The Use of Prosody in the Linguistic Components of a Speech Understanding System," IEEE Transactions on Speech and Audio Processing, vol. 8, No. 5, Sep. 2000, 14 pages.

Rice, J., et al., "Monthly Program: Nov. 14, 1995," The San Francisco Bay Area Chapter of ACM SIGCHI, http://www.baychi.org/calendar/19951114/, 2 pages.

Rice, J., et al., "Using the Web Instead of a Window System," Knowledge Systems Laboratory, Stanford University, http://tomgruber.org/writing/ksl-95-69.pdf, 14 pages.

Rivlin, Z., et al., "Maestro: Conductor of Multimedia Analysis Technologies," 1999 SRI International, Communications of the Association for Computing Machinery (CACM), 7 pages.

Sheth, A., et al., "Relationships at the Heart of Semantic Web: Modeling, Discovering, and Exploiting Complex Semantic Relationships," Oct. 13, 2002, Enhancing the Power of the Internet: Studies in Fuzziness and Soft Computing, SpringerVerlag, 38 pages.

Simonite, T., "One Easy Way to Make Siri Smarter," Oct. 18, 2011, Technology Review, http://www.technologyreview.com/printer_friendly_article.aspx?id=38915, 2 pages.

Stent, A., et al., "The CommandTalk Spoken Dialogue System," 1999, http://acl.ldc.upenn.edu/P/P99/P99-1024.pdf, 8 pages.

Tofel, K., et al., "SpeakTolt: A personal assistant for older iPhones, iPads," Feb. 9, 2012, http://gigaom.com/apple/speaktoit-siri-for-older-iphones-ipads/, 7 pages.

Tucker, J., "Too lazy to grab your TV remote? Use Siri instead," Nov. 30, 2011, http://www.engadget.com/2011/11/30/too-lazy-to-grab-your-tv-remote-use-siri-instead/, 8 pages.

Tur, G., et al., "The CALO Meeting Speech Recognition and Understanding System," 2008, Proc. IEEE Spoken Language Technology Workshop, 4 pages.

Tur, G., et al., "The-CALO-Meeting-Assistant System," IEEE Transactions on Audio, Speech, and Language Processing, vol. 18, No. 6, Aug. 2010, 11 pages.

Vlingo, "Vlingo Launches Voice Enablement Application on Apple App Store," Vlingo press release dated Dec. 3, 2008, 2 pages.

YouTube, "Knowledge Navigator," 5:34 minute video uploaded to YouTube by Knownav on Apr. 29, 2008, http://www.youtube.com/watch?v=QRH8eimU_20on Aug. 3, 2006, 1 page.

YouTube, "Send Text, Listen to and Send E-Mail 'By Voice' www.voiceassist.com," 2:11 minute video uploaded to YouTube by VoiceAssist on Jul. 30, 2009, http://www.youtube.com/watch?v=0tEU61nHHA4, 1 page.

YouTube, "Text'nDrive App Demo—Listen and Reply to your Messages by Voice while Driving!," 1:57 minute video uploaded to YouTube by TextnDrive on Apr. 27, 2010, http://www.youtube.com/watch?v=WaGfzoHsAMw, 1 page.

YouTube, "Voice on the Go (BlackBerry)," 2:51 minute video uploaded to YouTube by VoiceOnTheGo on Jul. 27, 2009, http://www.youtube.com/watch?v=pJqpWgQS98w, 1 page.

International Search Report and Written Opinion dated Nov. 29, 2011, received in International Application No. PCT/US2011/20861, which corresponds to U.S. Appl. No. 12/987,982, 15 pages (Thomas Robert Gruber).

Glass, J., et al., "Multilingual Spoken-Language Understanding in the MIT Voyager System," Aug. 1995, http://groups.csail.mit.edu/sls/publications/1995/speechcomm95-voyager.pdf, 29 pages.

Goddeau, D., et al., "A Form-Based Dialogue Manager for Spoken Language Applications," Oct. 1996, http://phasedance.com/pdf/icslp96.pdf, 4 pages.

Goddeau, D., et al., "Galaxy: A Human-Language Interface to On-Line Travel Information," 1994 International Conference on Spoken Language Processing, Sep. 18-22, 1994, Pacific Convention Plaza Yokohama, Japan, 6 pages.

Meng, H., et al., "Wheels: A Conversational System in the Automobile Classified Domain," Oct. 1996, httphttp://citeseerx.ist.psu.edu/viewdoc/summary?doi=10.1.1.16.3022, 4 pages.

*Phoenix Solutions, Inc.* v. *West Interactive Corp.*, Document 40, Declaration of Christopher Schmandt Regarding the MIT Galaxy System dated Jul. 2, 2010, 162 pages.

Seneff, S., et al., "A New Restaurant Guide Conversational System: Issues in Rapid Prototyping for Specialized Domains," Oct. 1996, citeseerx.ist.psu.edu/viewdoc/download?doi=10.1.1.16...rep . . . , 4 pages.

Vlingo InCar, "Distracted Driving Solution with Vlingo InCar," 2:38 minute video uploaded to YouTube by Vlingo Voice on Oct. 6, 2010, http://www.youtube.com/watch?v=Vqs8XfXxgz4, 2 pages.

Zue, V., "Conversational Interfaces: Advances and Challenges," Sep. 1997, http://www.cs.cmu.edu/~dod/papers/zue97.pdf, 10 pages.

Zue, V. W., "Toward Systems that Understand Spoken Language," Feb. 1994, ARPA Strategic Computing Institute, © 1994 IEEE, 9 pages.

Martin, D., et al., "The Open Agent Architecture: A Framework for building distributed software systems," Jan.-Mar. 1999, Applied Artificial Intelligence: An International Journal, vol. 13, No. 1-2, http://adam.cheyer.com/papers/oaa.pdf, 38 pages.

Agnäs, MS., et al., "Spoken Language Translator: First-Year Report," Jan. 1994, SICS (ISSN 0283-3638), SRI and Telia Research AB, 161 pages.

Allen, J., "Natural Language Understanding," 2nd Edition, Copyright © 1995 by The Benjamin/Cummings Publishing Company, Inc., 671 pages.

Alshawi, H., et al., "CLARE: A Contextual Reasoning and Cooperative Response Framework for the Core Language Engine," Dec. 1992, SRI International, Cambridge Computer Science Research Centre, Cambridge, 273 pages.

(56) References Cited

OTHER PUBLICATIONS

Alshawi, H., et al., "Declarative Derivation of Database Queries from Meaning Representations," Oct. 1991, Proceedings of the BANKAI Workshop on Intelligent Information Access, 12 pages.

Alshawi H., et al., "Logical Forms in The Core Language Engine," 1989, Proceedings of the 27th Annual Meeting of the Association for Computational Linguistics, 8 pages.

Alshawi, H., et al., "Overview of the Core Language Engine," Sep. 1988, Proceedings of Future Generation Computing Systems, Tokyo, 13 pages.

Alshawi, H., "Translation and Monotonic Interpretation/Generation," Jul. 1992, SRI International, Cambridge Computer Science Research Centre, Cambridge, 18 pages, http://www.cam.sri.com/tr/crc024/paper.ps.Z 1992.

Appelt, D., et al., "Fastus: A Finite-state Processor for Information Extraction from Real-world Text," 1993, Proceedings of IJCAI, 8 pages.

Appelt, D., et al., "SRI: Description of the JV-FASTUS System Used for MUC-5," 1993, SRI International, Artificial Intelligence Center, 19 pages.

Appelt, D., et al., SRI International Fastus System MUC-6 Test Results and Analysis, 1995, SRI International, Menlo Park, California, 12 pages.

Archbold, A., et al., "A Team User's Guide," Dec. 21, 1981, SRI International, 70 pages.

Bear, J., et al., "A System for Labeling Self-Repairs in Speech," Feb. 22, 1993, SRI International, 9 pages.

Bear, J., et al., "Detection and Correction of Repairs in Human-Computer Dialog," May 5, 1992, SRI International, 11 pages.

Bear, J., et al., "Integrating Multiple Knowledge Sources for Detection and Correction of Repairs in Human-Computer Dialog," 1992, Proceedings of the 30th annual meeting on Association for Computational Linguistics (ACL), 8 pages.

Bear, J., et al., "Using Information Extraction to Improve Document Retrieval," 1998, SRI International, Menlo Park, California, 11 pages.

Berry, P., et al., "Task Management under Change and Uncertainty Constraint Solving Experience with the CALO Project," 2005, Proceedings of CP'05 Workshop on Constraint Solving under Change, 5 pages.

Bobrow, R. et al., "Knowledge Representation for Syntactic/Semantic Processing," From: AAA-80 Proceedings. Copyright © 1980, AAAI, 8 pages.

Bouchou, B., et al., "Using Transducers in Natural Language Database Query," Jun. 17-19, 1999, Proceedings of 4th International Conference on Applications of Natural Language to Information Systems, Austria, 17 pages.

Bratt, H., et al., "The SRI Telephone-based ATIS System," 1995, Proceedings of ARPA Workshop on Spoken Language Technology, 3 pages.

Bulyko, I. et al., "Error-Correction Detection and Response Generation in a Spoken Dialogue System," © 2004 Elsevier B.V., specom. 2004.09.009, 18 pages.

Burke, R., et al., "Question Answering from Frequently Asked Question Files," 1997, AI Magazine, vol. 18, No. 2, 10 pages.

Burns, A., et al., "Development of a Web-Based Intelligent Agent for the Fashion Selection and Purchasing Process via Electronic Commerce," Dec. 31, 1998, Proceedings of the Americas Conference on Information system (AMCIS), 4 pages.

Carter, D., "Lexical Acquisition in the Core Language Engine," 1989, Proceedings of the Fourth Conference of the European Chapter of the Association for Computational Linguistics, 8 pages.

Carter, D., et al., "The Speech-Language Interface in the Spoken Language Translator," Nov. 23, 1994, SRI International, 9 pages.

Chai, J., et al., "Comparative Evaluation of a Natural Language Dialog Based System and a Menu Driven System for Information Access: a Case Study," Apr. 2000, Proceedings of the International Conference on Multimedia Information Retrieval (RIAO), Paris, 11 pages.

Cheyer, A., et al., "Multimodal Maps: An Agent-based Approach," International Conference on Cooperative Multimodal Communication, 1995, 15 pages.

Cheyer, A., et al., "The Open Agent Architecture," Autonomous Agents and Multi-Agent systems, vol. 4, Mar. 1, 2001, 6 pages.

Cheyer, A., et al., "The Open Agent Architecture: Building communities of distributed software agents" Feb. 21, 1998, Artificial Intelligence Center SRI International, Power Point presentation, downloaded from http://www.ai.sri.com/~oaa/, 25 pages.

Codd, E. F., "Databases: Improving Usability and Responsiveness—'How About Recently'," Copyright © 1978, by Academic Press, Inc., 28 pages.

Cohen, P.R., et al., "An Open Agent Architecture," 1994, 8 pages. http://citeseerx.ist.psu.edu/viewdoc/summary?doi=10.1.1.30.480.

Coles, L. S., et al., "Chemistry Question-Answering," Jun. 1969, SRI International, 15 pages.

Coles, L. S., "Techniques for Information Retrieval Using an Inferential Question-Answering System with Natural-Language Input," Nov. 1972, SRI International, 198 Pages.

Coles, L. S., "The Application of Theorem Proving to Information Retrieval," Jan. 1971, SRI International, 21 pages.

Constantinides, P., et al., "A Schema Based Approach to Dialog Control," 1998, Proceedings of the International Conference on Spoken Language Processing, 4 pages.

Cox, R. V., et al., "Speech and Language Processing for Next-Millennium Communications Services," Proceedings of the IEEE, vol. 88, No. 8, Aug. 2000, 24 pages.

Craig, J., et al., "Deacon: Direct English Access and Control," Nov. 7-10, 1966 AFIPS Conference Proceedings, vol. 19, San Francisco, 18 pages.

Dar, S., et al., "DTL's DataSpot: Database Exploration Using Plain Language," 1998 Proceedings of the 24th VLDB Conference, New York, 5 pages.

Davis, Z., et al., "A Personal Handheld Multi-Modal Shopping Assistant," 2006 IEEE, 9 pages.

Decker, K., et al., "Designing Behaviors for Information Agents," The Robotics Institute, Carnegie-Mellon University, paper, Jul. 6, 1996, 15 pages.

Decker, K., et al., "Matchmaking and Brokering," The Robotics Institute, Carnegie-Mellon University, paper, May 16, 1996, 19 pages.

Dowding, J., et al., "Gemini: A Natural Language System for Spoken-Language Understanding," 1993, Proceedings of the Thirty-First Annual Meeting of the Association for Computational Linguistics, 8 pages.

Dowding, J., et al., "Interleaving Syntax and Semantics in an Efficient Bottom-Up Parser," 1994, Proceedings of the 32nd Annual Meeting of the Association for Computational Linguistics, 7 pages.

Epstein, M., et al., "Natural Language Access to a Melanoma Data Base," Sep. 1978, SRI International, 7 pages.

Exhibit 1, "Natural Language Interface Using Constrained Intermediate Dictionary of Results," Classes/Subclasses Manually Reviewed for the Search of US Patent No. 7,177,798, Mar. 22, 2013, 1 page.

Exhibit 1, "Natural Language Interface Using Constrained Intermediate Dictionary of Results," List of Publications Manually reviewed for the Search of US Patent No. 7,177,798, Mar. 22, 2013, 1 page.

Ferguson, G., et al., "TRIPS: An Integrated Intelligent Problem-Solving Assistant," 1998, Proceedings of the Fifteenth National Conference on Artificial Intelligence (AAAI-98) and Tenth Conference on Innovative Applications of Artificial Intelligence (IAAI-98), 7 pages.

Fikes, R., et al., "A Network-based knowledge Representation and its Natural Deduction System," Jul. 1977, SRI International, 43 pages.

Gambäck, B., et al., "The Swedish Core Language Engine," 1992 NOTEX Conference, 17 pages.

Glass, J., et al., "Multilingual Language Generation Across Multiple Domains," Sep. 18-22, 1994, International Conference on Spoken Language Processing, Japan, 5 pages.

Green, C. "The Application of Theorem Proving to Question-Answering Systems," Jun. 1969, SRI Stanford Research Institute, Artificial Intelligence Group, 169 pages.

(56) References Cited

OTHER PUBLICATIONS

Gregg, D. G., "DSS Access on the WWW: An Intelligent Agent Prototype," 1998 Proceedings of the Americas Conference on Information Systems—Association for Information Systems, 3 pages.

Grishman, R., "Computational Linguistics: An Introduction," © Cambridge University Press 1986, 172 pages.

Grosz, B. et al., "Dialogic: A Core Natural-Language Processing System," Nov. 9, 1982, SRI International, 17 pages.

Grosz, B. et al., "Research on Natural-Language Processing at SRI," Nov. 1981, SRI International, 21 pages.

Grosz, B., et al., "Team: An Experiment in the Design of Transportable Natural-Language Interfaces," Artificial Intelligence, vol. 32, 1987, 71 pages.

Grosz, B., "Team: A Transportable Natural-Language Interface System," 1983, Proceedings of the First Conference on Applied Natural Language Processing, 7 pages.

Guida, G., et al., "NLI: A Robust Interface for Natural Language Person-Machine Communication," Int. J. Man-Machine Studies, vol. 17, 1982, 17 pages.

Guzzoni, D., et al., "Active, A platform for Building Intelligent Software," Computational Intelligence 2006, 5 pages. http://www.informatik.uni-trier.de/~ley/pers/hd/g/Guzzoni:Didier.

Guzzoni, D., "Active: A unified platform for building intelligent assistant applications," Oct. 25, 2007, 262 pages.

Guzzoni, D., et al., "Many Robots Make Short Work," 1996 AAAI Robot Contest, SRI International, 9 pages.

Haas, N., et al., "An Approach to Acquiring and Applying Knowledge," Nov. 1980, SRI International, 22 pages.

Hadidi, R., et al., "Students' Acceptance of Web-Based Course Offerings: An Empirical Assessment," 1998 Proceedings of the Americas Conference on Information Systems (AMCIS), 4 pages.

Hawkins, J., et al., "Hierarchical Temporal Memory: Concepts, Theory, and Terminology," Mar. 27, 2007, Numenta, Inc., 20 pages.

He, Q., et al., "Personal Security Agent: KQML-Based PKI," The Robotics Institute, Carnegie-Mellon University, paper, Oct. 1, 1997, 14 pages.

Hendrix, G. et al., "Developing a Natural Language Interface to Complex Data," ACM Transactions on Database Systems, vol. 3, No. 2, Jun. 1978, 43 pages.

Hendrix, G., "Human Engineering for Applied Natural Language Processing," Feb. 1977, SRI International, 27 pages.

Hendrix, G., "Klaus: A System for Managing Information and Computational Resources," Oct. 1980, SRI International, 34 pages.

Hendrix, G., "Lifer: A Natural Language Interface Facility," Dec. 1976, SRI Stanford Research Institute, Artificial Intelligence Center, 9 pages.

Hendrix, G., "Natural-Language Interface," Apr.-Jun. 1982, American Journal of Computational Linguistics, vol. 8, No. 2, 7 pages.

Hendrix, G., "The Lifer Manual: A Guide to Building Practical Natural Language Interfaces," Feb. 1977, SRI International, 76 pages.

Hendrix, G., et al., "Transportable Natural-Language Interfaces to Databases," Apr. 30, 1981, SRI International, 18 pages.

Hirschman, L., et al., "Multi-Site Data Collection and Evaluation in Spoken Language Understanding," 1993, Proceedings of the workshop on Human Language Technology, 6 pages.

Hobbs, J., et al., "Fastus: A System for Extracting Information from Natural-Language Text," Nov. 19, 1992, SRI International, Artificial Intelligence Center, 26 pages.

Hobbs, J., et al., "Fastus: Extracting Information from Natural-Language Texts," 1992, SRI International, Artificial Intelligence Center, 22 pages.

Hobbs, J., "Sublanguage and Knowledge," Jun. 1984, SRI International, Artificial Intelligence Center, 30 pages.

Hodjat, B., et al., "Iterative Statistical Language Model Generation for Use with an Agent-Oriented Natural Language Interface," vol. 4 of the Proceedings of HCI International 2003, 7 pages.

Huang, X., et al., "The SPHINX-II Speech Recognition System: An Overview," Jan. 15, 1992, Computer, Speech and Language, 14 pages.

Issar, S., et al., "CMU's Robust Spoken Language Understanding System," 1993, Proceedings of Eurospeech, 4 pages.

Issar, S., "Estimation of Language Models for New Spoken Language Applications," Oct. 3-6, 1996, Proceedings of 4th International Conference on Spoken language Processing, Philadelphia, 4 pages.

Janas, J., "The Semantics-Based Natural Language Interface to Relational Databases," © Springer-Verlag Berlin Heidelberg 1986, Germany, 48 pages.

Johnson, J., "A Data Management Strategy for Transportable Natural Language Interfaces," Jun. 1989, doctoral thesis submitted to the Department of Computer Science, University of British Columbia, Canada, 285 pages.

Julia, L., et al., "http://www.speech.sri.com/demos/atis.html," 1997, Proceedings of AAAI, Spring Symposium, 5 pages.

Kahn, M., et al., "CoABS Grid Scalability Experiments," 2003, Autonomous Agents and Multi-Agent Systems, vol. 7, 8 pages.

Kamel, M., et al., "A Graph Based Knowledge Retrieval System," © 1990 IEEE, 7 pages.

Katz, B., "Annotating the World Wide Web Using Natural Language," 1997, Proceedings of the 5th RIAO Conference on Computer Assisted Information Searching on the Internet, 7 pages.

Katz, B., "A Three-Step Procedure for Language Generation," Dec. 1980, Massachusetts Institute of Technology, Artificial Intelligence Laboratory, 42 pages.

Kats, B., et al., "Exploiting Lexical Regularities in Designing Natural Language Systems," 1988, Proceedings of the 12th International Conference on Computational Linguistics, Coling'88, Budapest, Hungary, 22 pages.

Katz, B., et al., "REXTOR: A System for Generating Relations from Natural Language," In Proceedings of the ACL Oct. 2000 Workshop on Natural Language Processing and Information Retrieval (NLP&IR), 11 pages.

Katz, B., "Using English for Indexing and Retrieving," 1988 Proceedings of the 1st RIAO Conference on User-Oriented Content-Based Text and Image (RIAO'88), 19 pages.

Konolige, K., "A Framework for a Portable Natural-Language Interface to Large Data Bases," Oct. 12, 1979, SRI International, Artificial Intelligence Center, 54 pages.

Laird, J., et al., "SOAR: An Architecture for General Intelligence," 1987, Artificial Intelligence vol. 33, 64 pages.

Langly, P., et al.,"A Design for the Icarus Architechture," SIGART Bulletin, vol. 2, No. 4, 6 pages.

Larks, "Intelligent Software Agents: Larks," 2006, downloaded on Mar. 15, 2013 from http://www.cs.cmu.edu/larks.html, 2 pages.

Martin, D., et al., "Building Distributed Software Systems with the Open Agent Architecture," Mar. 23-25, 1998, Proceedings of the Third International Conference on the Practical Application of Intelligent Agents and Multi-Agent Technology, 23 pages.

Martin, D., et al., "Development Tools for the Open Agent Architecture," Apr. 1996, Proceedings of the International Conference on the Practical Application of Intelligent Agents and Multi-Agent Technology, 17 pages.

Martin, D., et al., "Information Brokering in an Agent Architecture," Apr. 1997, Proceedings of the second International Conference on the Practical Application of Intelligent Agents and Multi-Agent Technology, 20 pages.

Martin, D., et al., "PAAM '98 Tutorial: Building and Using Practical Agent Applications," 1998, SRI International, 78 pages.

Martin, P., et al., "Transportability and Generality in a Natural-Language Interface System," Aug. 8-12, 1983, Proceedings of the Eight International Joint Conference on Artificial Intelligence, West Germany, 21 pages.

Matiasek, J., et al., "Tamic-P: A System for NL Access to Social Insurance Database," Jun. 17-19, 1999, Proceeding of the 4th International Conference on Applications of Natural Language to Information Systems, Austria, 7 pages.

Michos, S.E., et al., "Towards an adaptive natural language interface to command languages," Natural Language Engineering 2 (3), © 1994 Cambridge University Press, 19 pages.

Milstead, J., et al., "Metadata: Cataloging by Any Other Name . . ." Jan. 1999, Online, Copyright © 1999 Information Today, Inc., 18 pages.

(56) References Cited

OTHER PUBLICATIONS

Minker, W., et al., "Hidden Understanding Models for Machine Translation," 1999, Proceedings of ETRW on Interactive Dialogue in Multi-Modal Systems, 4 pages.
Modi, P. J., et al., "CMRadar: A Personal Assistant Agent for Calendar Management," © 2004, American Association for Artificial Intelligence, Intelligent Systems Demonstrations, 2 pages.
Moore, R., et al., "Combining Linguistic and Statistical Knowledge Sources in Natural-Language Processing for ATIS," 1995, SRI International, Artificial Intelligence Center, 4 pages.
Moore, R., "Handling Complex Queries in a Distributed Data Base," Oct. 8, 1979, SRI International, Artificial Intelligence Center, 38 pages.
Moore, R., "Practical Natural-Language Processing by Computer," Oct. 1981, SRI International, Artificial Intelligence Center, 34 pages.
Moore, R., et al., "SRI's Experience with the ATIS Evaluation," Jun. 24-27, 1990, Proceedings of a workshop held at Hidden Valley, Pennsylvania, 4 pages.
Moore, et al., "The Information Warefare Advisor: An Architecture for Interacting with Intelligent Agents Across the Web," Dec. 31, 1998 Proceedings of Americas Conference on Information Systems (AMCIS), 4 pages.
Moore, R., "The Role of Logic in Knowledge Representation and Commonsense Reasoning," Jun. 1982, SRI International, Artificial Intelligence Center, 19 pages.
Moore, R., "Using Natural-Language Knowledge Sources in Speech Recognition," Jan. 1999, SRI International, Artificial Intelligence Center, 24 pages.
Moran, D., et al., "Intelligent Agent-based User Interfaces," Oct. 12-13, 1995, Proceedings of International Workshop on Human Interface Technology, University of Aizu, Japan, 4 pages. http://www.dougmoran.com/dmoran/PAPERS/oaa-iwhit1995.pdf.
Moran, D., "Quantifier Scoping in the SRI Core Language Engine," 1988, Proceedings of the 26th annual meeting on Association for Computational Linguistics, 8 pages.
Motro, A., "Flex: A Tolerant and Cooperative User Interface to Databases," IEEE Transactions on Knowledge and Data Engineering, vol. 2, No. 2, Jun. 1990, 16 pages.
Murveit, H., et al., "Speech Recognition in SRI's Resource Management and ATIS Systems," 1991, Proceedings of the workshop on Speech and Natural Language (HTL'91), 7 pages.
OAA, "The Open Agent Architecture 1.0 Distribution Source Code," Copyright 1999, SRI International, 2 pages.
Odubiyi, J., et al., "SAIRE—a scalable agent-based information retrieval engine," 1997 Proceedings of the First International Conference on Autonomous Agents, 12 pages.
Owei, V., et al., "Natural Language Query Filtration in the Conceptual Query Language," © 1997 IEEE, 11 pages.
Pannu, A., et al., "A Learning Personal Agent for Text Filtering and Notification," 1996, The Robotics Institute School of Computer Science, Carnegie-Mellon University, 12 pages.
Pereira, "Logic for Natural Language Analysis," Jan. 1983, SRI International, Artificial Intelligence Center, 194 pages.
Perrault, C.R., et al., "Natural-Language Interfaces," Aug. 22, 1986, SRI International, 48 pages.
Pulman, S.G., et al., "Clare: A Combined Language and Reasoning Engine," 1993, Proceedings of JFIT Conference, 8 pages. URL: http://www.cam.sri.com/tr/crc042/paper.ps.Z.
Ravishankar, "Efficient Algorithms for Speech Recognition," May 15, 1996, Doctoral Thesis submitted to School of Computer Science, Computer Science Division, Carnegie Mellon University, Pittsburg, 146 pages.
Rayner, M., et al., "Adapting the Core Language Engine to French and Spanish," May 10, 1996, Cornell University Library, 9 pages. http://arxiv.org/abs/cmp-lg/9605015.
Rayner, M., "Abductive Equivalential Translation and its application to Natural Language Database Interfacing," Sep. 1993 Dissertation paper, SRI International, 163 pages.

Rayner, M., et al., "Deriving Database Queries from Logical Forms by Abductive Definition Expansion," 1992, Proceedings of the Third Conference on Applied Natural Language Processing, ANLC'92, 8 pages.
Rayner, M., "Linguistic Domain Theories: Natural-Language Database Interfacing from First Principles," 1993, SRI International, Cambridge, 11 pages.
Rayner, M., et al., "Spoken Language Translation With Mid-90's Technology: A Case Study," 1993, EUROSPEECH, ISCA, 4 pages. http://dblp.uni-trier.de/db/conf/interspeech/eurospeech1993. html#RaynerBCCDGKKLPPS93.
Rudnicky, A.I., et al., "Creating Natural Dialogs in the Carnegie Mellon Communicator System."
Russell, S., et al., "Artificial Intelligence, A Modern Approach," © 1995 Prentice Hall, Inc., 121 pages.
Sacerdoti, E., et al., "A Ladder User's Guide (Revised)," Mar. 1980, SRI International, Artificial Intelligence Center, 39 pages.
Sagalowicz, D., "A D-Ladder User's Guide," Sep. 1980, SRI International, 42 pages.
Sameshima, Y., et al., "Authorization with security attributes and privilege delegation Access control beyond the ACL," Computer Communications, vol. 20, 1997, 9 pages.
San-Segundo, R., et al., "Confidence Measures for Dialogue Management in the CU Communicator System," Jun. 5-9, 2000, Proceedings of Acoustics, Speech, and Signal Processing (ICASSP'00), 4 pages.
Sato, H., "A Data Model, Knowledge Base, and Natural Language Processing for Sharing a Large Statistical Database," 1989, Statistical and Scientific Database Management, Lecture Notes in Computer Science, vol. 339, 20 pages.
Schnelle, D., "Context Aware Voice User Interfaces for Workflow Support," Aug. 27, 2007, Dissertation paper, 254 pages.
Sharoff, S., et al., "Register-domain Separation as a Methodology for Development of Natural Language Interfaces to Databases," 1999, Proceedings of Human-Computer Interaction (INTERACT'99), 7 pages.
Shimazu, H., et al., "CAPIT: Natural Language Interface Design Tool with Keyword Analyzer and Case-Based Parser," NEC Research & Development, vol. 33, No. 4, Oct. 1992, 11 pages.
Shinkle, L., "Team User's Guide," Nov. 1984, SRI International, Artificial Intelligence Center, 78 pages.
Shklar, L., et al., "Info Harness: Use of Automatically Generated Metadata for Search and Retrieval of Heterogeneous Information," 1995 Proceedings of CAiSE'95, Finland.
Singh, N., "Unifying Heterogeneous Information Models," 1998 Communications of the ACM, 13 pages.
SRI2009, "SRI Speech: Products: Software Development Kits: EduSpeak," 2009, 2 pages. available at http://web.archive.org/web/20090828084033/http://www.speechatsri.com/products/eduspeak.shtml.
Starr, B., et al., "Knowledge-Intensive Query Processing," May 31, 1998, Proceedings of the 5th KRDB Workshop, Seattle, 6 pages.
Stern, R., et al. "Multiple Approaches to Robust Speech Recognition," 1992, Proceedings of Speech and Natural Language Workshop, 6 pages.
Stickel, "A Nonclausal Connection-Graph Resolution Theorem-Proving Program," 1982, Proceedings of AAAI'82, 5 pages.
Sugumaran, V., "A Distributed Intelligent Agent-Based Spatial Decision Support System," Dec. 31, 1998, Proceedings of the Americas Conference on Information systems (AMCIS), 4 pages.
Sycara, K., et al., "Coordination of Multiple Intelligent Software Agents," International Journal of Cooperative Information Systems (IJCIS), vol. 5, Nos. 2 & 3, Jun. & Sep. 1996, 33 pages.
Sycara, K., et al., "Distributed Intelligent Agents," IEEE Expert, vol. 11, No. 6, Dec. 1996, 32 pages.
Sycara, K., et al., "Dynamic Service Matchmaking Among Agents in Open Information Environments," 1999, SIGMOD Record, 7 pages.
Sycara, K., et al., "The RETSINA MAS Infrastructure," 2003, Autonomous Agents and Multi-Agent Systems, vol. 7, 20 pages.
Tyson, M., et al., "Domain-Independent Task Specification in the TACITUS Natural Language System," May 1990, SRI International, Artificial Intelligence Center, 16 pages.

(56) References Cited

OTHER PUBLICATIONS

Wahlster, W., et al., "Smartkom: multimodal communication with a life-like character," 2001 EUROSPEECH—Scandinavia, 7th European Conference on Speech Communication and Technology, 5 pages.
Waldinger, R., et al., "Deductive Question Answering from Multiple Resources," 2003, New Directions in Question Answering, published by AAAI, Menlo Park, 22 pages.
Walker, D., et al., "Natural Language Access to Medical Text," Mar. 1981, SRI International, Artificial Intelligence Center, 23 pages.
Waltz, D., "An English Language Question Answering System for a Large Relational Database," © 1978 ACM, vol. 21, No. 7, 14 pages.
Ward, W., et al., "A Class Based Language Model for Speech Recognition," © 1996 IEEE, 3 pages.
Ward, W., et al., "Recent Improvements in the CMU Spoken Language Understanding System," 1994, ARPA Human Language Technology Workshop, 4 pages.
Ward, W., "The CMU Air Travel Information Service: Understanding Spontaneous Speech," 3 pages.
Warren, D.H.D., et al., "An Efficient Easily Adaptable System for Interpreting Natural Language Queries," Jul.-Dec. 1982, American Journal of Computational Linguistics, vol. 8, No. 3-4, 11 pages.
Weizenbaum, J., "ELIZA—A Computer Program for the Study of Natural Language Communication Between Man and Machine," Communications of the ACM, vol. 9, No. 1, Jan. 1966, 10 pages.
Winiwarter, W., "Adaptive Natural Language Interfaces to FAQ Knowledge Bases," Jun. 17-19, 1999, Proceedings of 4th International Conference on Applications of Natural Language to Information Systems, Austria, 22 pages.
Wu, X. et al., "KDA: A Knowledge-based Database Assistant," Data Engineering, Feb. 6-10, 1989, Proceeding of the Fifth International Conference on Engineering (IEEE Cat. No. 89CH2695-5), 8 pages.
Yang, J., et al., "Smart Sight: A Tourist Assistant System," 1999 Proceedings of Third International Symposium on Wearable Computers, 6 pages.
Zeng, D., et al., "Cooperative Intelligent Software Agents," The Robotics Institute, Carnegie-Mellon University, Mar. 1995, 13 pages.
Zhao, L., "Intelligent Agents for Flexible Workflow Systems," Oct. 31, 1998 Proceedings of the Americas Conference on Information Systems (AMCIS), 4 pages.
Zue, V., et al., "From Interface to Content: Translingual Access and Delivery of On-Line Information," 1997, EUROSPEECH, 4 pages.
Zue, V., et al., "Jupiter: A Telephone-Based Conversational Interface for Weather Information," Jan. 2000, IEEE Transactions on Speech and Audio Processing, 13 pages.
Zue, V., et al., "Pegasus: A Spoken Dialogue Interface for On-Line Air Travel Planning," 1994 Elsevier, Speech Communication 15 (1994), 10 pages.
Zue, V., et al., "The Voyager Speech Understanding System: Preliminary Development and Evaluation," 1990, Proceedings of IEEE 1990 International Conference on Acoustics, Speech, and Signal Processing, 4 pages.
Acero, A., et al., "Environmental Robustness in Automatic Speech Recognition," International Conference on Acoustics, Speech, and Signal Processing (ICASSP'90), Apr. 3-6, 1990, 4 pages.
Acero, A., et al., "Robust Speech Recognition by Normalization of The Acoustic Space," International Conference on Acoustics, Speech, and Signal Processing, 1991, 4 pages.
Ahlbom, G., et al., "Modeling Spectral Speech Transitions Using Temporal Decomposition Techniques," IEEE International Conference of Acoustics, Speech, and Signal Processing (ICASSP'87), Apr. 1987, vol. 12, 4 pages.
Aikawa, K., "Speech Recognition Using Time-Warping Neural Networks," Proceedings of the 1991 IEEE Workshop on Neural Networks for Signal Processing, Sep. 30 to Oct. 1, 1991, 10 pages.
Anastasakos, A., et al., "Duration Modeling in Large Vocabulary Speech Recognition," International Conference on Acoustics, Speech, and Signal Processing (ICASSP'95), May 9-12, 1995, 4 pages.

Anderson, R. H., "Syntax-Directed Recognition of Hand-Printed Two-Dimensional Mathematics," In Proceedings of Symposium on Interactive Systems for Experimental Applied Mathematics: Proceedings of the Association for Computing Machinery Inc. Symposium, © 1967, 12 pages.
Ansari, R., et al., "Pitch Modification of Speech using a Low-Sensitivity Inverse Filter Approach," IEEE Signal Processing Letters, vol. 5, No. 3, Mar. 1998, 3 pages.
Anthony, N. J., et al., "Supervised Adaption for Signature Verification System," Jun. 1, 1978, IBM Technical Disclosure, 3 pages.
Apple Computer, "Guide Maker User's Guide," © Apple Computer, Inc., Apr. 27, 1994, 8 pages.
Apple Computer, "Introduction to Apple Guide," © Apple Computer, Inc., Apr. 28, 1994, 20 pages.
Asanović, K., et al., "Experimental Determination of Precision Requirements for Back-Propagation Training of Artificial Neural Networks," In Proceedings of the 2nd International Conference of Microelectronics for Neural Networks, 1991, www.ICSI.Berkeley. EDU, 7 pages.
Atal, B. S., "Efficient Coding of LPC Parameters by Temporal Decomposition," IEEE International Conference on Acoustics, Speech, and Signal Processing (ICASSP'83), Apr. 1983, 4 pages.
Bahl, L. R., et al., "Acoustic Markov Models Used in the Tangora Speech Recognition System," In Proceeding of International Conference on Acoustics, Speech, and Signal Processing (ICASSP'88), Apr. 11-14, 1988, vol. 1, 4 pages.
Bahl, L. R., et al., "A Maximum Likelihood Approach to Continuous Speech Recognition," IEEE Transaction on Pattern Analysis and Machine Intelligence, vol. PAMI-5, No. 2, Mar. 1983, 13 pages.
Bahl, L. R., et al., "A Tree-Based Statistical Language Model for Natural Language Speech Recognition," IEEE Transactions on Acoustics, Speech and Signal Processing, vol. 37, Issue 7, Jul. 1989, 8 pages.
Bahl, L. R., et al., "Large Vocabulary Natural Language Continuous Speech Recognition," In Proceedings of 1989 International Conference on Acoustics, Speech, and Signal Processing, May 23-26, 1989, vol. 1, 6 pages.
Bahl, L. R., et al, "Multonic Markov Word Models for Large Vocabulary Continuous Speech Recognition," IEEE Transactions on Speech and Audio Processing, vol. 1, No. 3, Jul. 1993, 11 pages.
Bahl, L. R., et al., "Speech Recognition with Continuous-Parameter Hidden Markov Models," In Proceeding of International Conference on Acoustics, Speech, and Signal Processing (ICASSP'88), Apr. 11-14, 1988, vol. 1, 8 pages.
Banbrook, M., "Nonlinear Analysis of Speech from a Synthesis Perspective," A thesis submitted for the degree of Doctor of Philosophy, The University of Edinburgh, Oct. 15, 1996, 35 pages.
Belaid, A., et al., "A Syntactic Approach for Handwritten Mathematical Formula Recognition," IEEE Transactions on Pattern Analysis and Machine Intelligence, vol. PAMI-6, No. 1, Jan. 1984, 7 pages.
Bellegarda, E. J., et al., "On-Line Handwriting Recognition Using Statistical Mixtures," Advances in Handwriting and Drawings: A Multidisciplinary Approach, Europia, 6th International IGS Conference on Handwriting and Drawing, Paris—France, Jul. 1993, 11 pages.
Bellegarda, J. R., "A Latent Semantic Analysis Framework for Large-Span Language Modeling," 5th European Conference on Speech, Communication and Technology, (EUROSPEECH'97), Sep. 22-25, 1997, 4 pages.
Bellegarda, J. R., "A Multispan Language Modeling Framework for Large Vocabulary Speech Recognition," IEEE Transactions on Speech and Audio Processing, vol. 6, No. 5, Sep. 1998, 12 pages.
Bellegarda, J. R., et al., "A Novel Word Clustering Algorithm Based on Latent Semantic Analysis," In Proceedings of the IEEE International Conference on Acoustics, Speech, and Signal Processing (ICASSEP'96), vol. 1, 4 pages.
Bellegarda, J. R., et al., "Experiments Using Data Augmentation for Speaker Adaptation," International Conference on Acoustics, Speech, and Signal Processing (ICASSEP'95), May 9-12, 1995, 4 pages.
Bellegarda, J. R., "Exploiting Both Local and Global Constraints for Multi-Span Statistical Language Modeling," Proceeding of the 1998

(56) References Cited

OTHER PUBLICATIONS

IEEE International Conference on Acoustics, Speech, and Signal Processing (ICASSP'98), vol. 2, May 12-15, 1998, 5 pages.
Bellegarda, J. R., "Exploiting Latent Semantic Information in Statistical Language Modeling," In Proceedings of the IEEE, Aug. 2000, vol. 88, No. 8, 18 pages.
Bellegarda, J. R., "Interaction-Driven Speech Input—A Data-Driven Approach to the Capture of Both Local and Global Language Constraints," 1992, 7 pages, available at http://old.sigchi.org/bulletin/1998.2/bellegarda.html.
Bellegarda, J. R., "Large Vocabulary Speech Recognition with Multispan Statistical Language Models," IEEE Transactions on Speech and Audio Processing, vol. 8, No. 1, Jan. 2000, 9 pages.
Bellegarda, J. R., et al., "Performance of the IBM Large Vocabulary Continuous Speech Recognition System on the ARPA Wall Street Journal Task," Signal Processing VII: Theories and Applications, © 1994 European Association for Signal Processing, 4 pages.
Bellegarda, J. R., et al., "The Metamorphic Algorithm: A Speaker Mapping Approach to Data Augmentation," IEEE Transactions on Speech and Audio Processing, vol. 2, No. 3, Jul. 1994, 8 pages.
Black, A. W., et al., "Automatically Clustering Similar Units for Unit Selection in Speech Synthesis," In Proceedings of Eurospeech 1997, vol. 2, 4 pages.
Blair, D. C., et al., "An Evaluation of Retrieval Effectiveness for a Full-Text Document-Retrieval System," Communications of the ACM, vol. 28, No. 3, Mar. 1985, 11 pages.
Briner, L. L., "Identifying Keywords in Text Data Processing," In Zelkowitz, Marvin V., ED, Directions and Challenges, 15th Annual Technical Symposium, Jun. 17, 1976, Gaithersbury, Maryland, 7 pages.
Bulyko, I., et al., "Joint Prosody Prediction and Unit Selection for Concatenative Speech Synthesis," Electrical Engineering Department, University of Washington, Seattle, 2001, 4 pages.
Bussey, H. E., et al., "Service Architecture, Prototype Description, and Network Implications of a Personalized Information Grazing Service," INFOCOM'90, Ninth Annual Joint Conference of the IEEE Computer and Communication Societies, Jun. 3-7, 1990, http://slrohall.com/publications/, 8 pages.
Buzo, A., et al., "Speech Coding Based Upon Vector Quantization," IEEE Transactions on Acoustics, Speech, and Signal Processing, vol. Assp-28, No. 5, Oct. 1980, 13 pages.
Caminero-Gil, J., et al., "Data-Driven Discourse Modeling for Semantic Interpretation," In Proceedings of the IEEE International Conference on Acoustics, Speech, and Signal Processing, May 7-10, 1996, 6 pages.
Cawley, G. C., "The Application of Neural Networks to Phonetic Modelling," PhD Thesis, University of Essex, Mar. 1996, 13 pages.
Chang, S., et al., "A Segment-based Speech Recognition System for Isolated Mandarin Syllables," Proceedings TENCON '93, IEEE Region 10 conference on Computer, Communication, Control and Power Engineering, Oct. 19-21, 1993, vol. 3, 6 pages.
Conklin, J., "Hypertext: An Introduction and Survey," Computer Magazine, Sep. 1987, 25 pages.
Connolly, F. T., et al., "Fast Algorithms for Complex Matrix Multiplication Using Surrogates," IEEE Transactions on Acoustics, Speech, and Signal Processing, Jun. 1989, vol. 37, No. 6, 13 pages.
Deerwester, S., et al., "Indexing by Latent Semantic Analysis," Journal of the American Society for Information Science, vol. 41, No. 6, Sep. 1990, 19 pages.
Deller, Jr., J. R., et al., "Discrete-Time Processing of Speech Signals," © 1987 Prentice Hall, ISBN: 0-02-328301-7, 14 pages.
Digital Equipment Corporation, "Open VMS Software Overview," Dec. 1995, software manual, 159 pages.
Donovan, R. E., "A New Distance Measure for Costing Spectral Discontinuities in Concatenative Speech Synthesisers," 2001, http://citeseerx.ist.psu.edu/viewdoc/summary?doi=10.1.1.21.6398, 4 pages.
Frisse, M. E., "Searching for Information in a Hypertext Medical Handbook," Communications of the ACM, vol. 31, No. 7, Jul. 1988, 8 pages.

Goldberg, D., et al., "Using Collaborative Filtering to Weave an Information Tapestry," Communications of the ACM, vol. 35, No. 12, Dec. 1992, 10 pages.
Gorin, A. L., et al., "On Adaptive Acquisition of Language," International Conference on Acoustics, Speech, and Signal Processing (ICASSP'90), vol. 1, Apr. 3-6, 1990, 5 pages.
Gotoh, Y., et al., "Document Space Models Using Latent Semantic Analysis," In Proceedings of Eurospeech, 1997, 4 pages.
Gray, R. M., "Vector Quantization," IEEE ASSP Magazine, Apr. 1984, 26 pages.
Harris, F. J., "On the Use of Windows for Harmonic Analysis with the Discrete Fourier Transform," In Proceedings of the IEEE, vol. 66, No. 1, Jan. 1978, 34 pages.
Helm, R., et al., "Building Visual Language Parsers," In Proceedings of CHI'91 Proceedings of the SIGCHI Conference on Human Factors in Computing Systems, 8 pages.
Hermansky, H., "Perceptual Linear Predictive (PLP) Analysis of Speech," Journal of the Acoustical Society of America, vol. 87, No. 4, Apr. 1990, 15 pages.
Hermansky, H., "Recognition of Speech in Additive and Convolutional Noise Based on Rasta Spectral Processing," In proceedings of IEEE International Conference on Acoustics, speech, and Signal Processing (ICASSP'93), Apr. 27-30, 1993, 4 pages.
Hoehfeld M., et al., "Learning with Limited Numerical Precision Using the Cascade-Correlation Algorithm," IEEE Transactions on Neural Networks, vol. 3, No. 4, Jul. 1992, 18 pages.
Holmes, J. N., "Speech Synthesis and Recognition—Stochastic Models for Word Recognition," Speech Synthesis and Recognition, Published by Chapman & Hall, London, ISBN 0 412 53430 4, © 1998 J. N. Holmes, 7 pages.
Hon, H.W., et al., "CMU Robust Vocabulary-Independent Speech Recognition System," IEEE International Conference on Acoustics, Speech, and Signal Processing (ICASSP-91), Apr. 14-17, 1991, 4 pages.
IBM Technical Disclosure Bulletin, "Speech Editor," vol. 29, No. 10, Mar. 10, 1987, 3 pages.
IBM Technical Disclosure Bulletin, "Integrated Audio-Graphics User Interface," vol. 33, No. 11, Apr. 1991, 4 pages.
IBM Technical Disclosure Bulletin, "Speech Recognition with Hidden Markov Models of Speech Waveforms," vol. 34, No. 1, Jun. 1991, 10 pages.
Iowegian International, "FIR Filter Properties," dspGuro, Digital Signal Processing Central, http://www.dspguru.com/dsp/tags/fir/properties, downloaded on Jul. 28, 2010, 6 pages.
Jacobs, P. S., et al., "Scisor: Extracting Information from On-Line News," Communications of the ACM, vol. 33, No. 11, Nov. 1990, 10 pages.
Jelinek, F., "Self-Organized Language Modeling for Speech Recognition," Readings in Speech Recognition, edited by Alex Waibel and Kai-Fu Lee, May 15, 1990, © 1990 Morgan Kaufmann Publishers, Inc., ISBN: 1-55860-124-4, 63 pages.
Jennings, A., et al., "A Personal News Service Based on a User Model Neural Network," IEICE Transactions on Information and Systems, vol. E75-D, No. 2, Mar. 1992, Tokyo, JP, 12 pages.
Ji, T., et al., "A Method for Chinese Syllables Recognition based upon Sub-syllable Hidden Markov Model," 1994 International Symposium on Speech, Image Processing and Neural Networks, Apr. 13-16, 1994, Hong Kong, 4 pages.
Jones, J., "Speech Recognition for Cyclone," Apple Computer, Inc., E.R.S., Revision 2.9, Sep. 10, 1992, 93 pages.
Katz, S. M., "Estimation of Probabilities from Sparse Data for the Language Model Component of a Speech Recognizer," IEEE Transactions on Acoustics, Speech, and Signal Processing, vol. ASSP-35, No. 3, Mar. 1987, 3 pages.
Kitano, H., "PhiDM-Dialog, An Experimental Speech-to-Speech Dialog Translation System," Jun. 1991 Computer, vol. 24, No. 6, 13 pages.
Klabbers, E., et al., "Reducing Audible Spectral Discontinuities," IEEE Transactions on Speech and Audio Processing, vol. 9, No. 1, Jan. 2001, 13 pages.
Klatt, D. H., "Linguistic Uses of Segmental Duration in English: Acoustic and Perpetual Evidence," Journal of the Acoustical Society of America, vol. 59, No. 5, May 1976, 16 pages.

(56) References Cited

OTHER PUBLICATIONS

Kominek, J., et al., "Impact of Durational Outlier Removal from Unit Selection Catalogs," 5th ISCA Speech Synthesis Workshop, Jun. 14-16, 2004, 6 pages.

Kubala, F., et al., "Speaker Adaptation from a Speaker-Independent Training Corpus," International Conference on Acoustics, Speech, and Signal Processing (ICASSEP'90), Apr. 3-6, 1990, 4 pages.

Kubala, F., et al., "The Hub and Spoke Paradigm for CSR Evaluation," Proceedings of the Spoken Language Technology Workshop, Mar. 6-8, 1994, 9 pages.

Lee, K.F., "Large-Vocabulary Speaker-Independent Continuous Speech Recognition: The SPHINX System," Apr. 18, 1988, Partial fulfillment of the requirements for the degree of Doctor of Philosophy, Computer Science Department, Carnegie Mellon University, 195 pages.

Lee, L., et al., "A Real-Time Mandarin Dictation Machine for Chinese Language with Unlimited Texts and Very Large Vocabulary," International Conference on Acoustics, Speech and Signal Processing, vol. 1, Apr. 3-6, 1990, 5 pages.

Lee, L, et al., "Golden Mandarin(II)—An Improved Single-Chip Real-Time Mandarin Dictation Machine for Chinese Language with Very Large Vocabulary," 0-7803-0946-4/93 © 1993IEEE, 4 pages.

Lee, L, et al., "Golden Mandarin(II)—An Intelligent Mandarin Dictation Machine for Chinese Character Input with Adaptation/Learning Functions," International Symposium on Speech, Image Processing and Neural Networks, Apr. 13-16, 1994, Hong Kong, 5 pages.

Lee, L., et al., "System Description of Golden Mandarin (I) Voice Input for Unlimited Chinese Characters," International Conference on Computer Processing of Chinese & Oriental Languages, vol. 5, Nos. 3 & 4, Nov. 1991, 16 pages.

Lin, C.H., et al., "A New Framework for Recognition of Mandarin Syllables With Tones Using Sub-syllabic Unites," IEEE International Conference on Acoustics, Speech, and Signal Processing (ICASSEP-93), Apr. 27-30, 1993, 4 pages.

Linde, Y., et al., "An Algorithm for Vector Quantizer Design," IEEE Transactions on Communications, vol. 28, No. 1, Jan. 1980, 12 pages.

Liu, F.H., et al., "Efficient Joint Compensation of Speech for the Effects of Additive Noise and Linear Filtering," IEEE International Conference of Acoustics, Speech, and Signal Processing, ICASSP-92, Mar. 23-26, 1992, 4 pages.

Logan, B., "Mel Frequency Cepstral Coefficients for Music Modeling," In International Symposium on Music Information Retrieval, 2000, 2 pages.

Lowerre, B. T., "The-HARPY Speech Recognition System," Doctoral Dissertation, Department of Computer Science, Carnegie Mellon University, Apr. 1976, 20 pages.

Maghbouleh, A., "An Empirical Comparison of Automatic Decision Tree and Linear Regression Models for Vowel Durations," Revised version of a paper presented at the Computational Phonology in Speech Technology workshop, 1996 annual meeting of the Association for Computational Linguistics in Santa Cruz, California, 7 pages.

Markel, J. D., et al., "Linear Prediction of Speech," Springer-Verlag, Berlin Heidelberg New York 1976, 12 pages.

Morgan, B., "Business Objects," (Business Objects for Windows) Business Objects Inc., DBMS Sep. 1992, vol. 5, No. 10, 3 pages.

Mountford, S. J., et al., "Talking and Listening to Computers," The Art of Human-Computer Interface Design, Copyright © 1990 Apple Computer, Inc. Addison-Wesley Publishing Company, Inc., 17 pages.

Murty, K. S. R., et al., "Combining Evidence from Residual Phase and MFCC Features for Speaker Recognition," IEEE Signal Processing Letters, vol. 13, No. 1, Jan. 2006, 4 pages.

Murveit H. et al., "Integrating Natural Language Constraints into HMM-based Speech Recognition," 1990 International Conference on Acoustics, Speech, and Signal Processing, Apr. 3-6, 1990, 5 pages.

Nakagawa, S., et al., "Speaker Recognition by Combining MFCC and Phase Information," IEEE International Conference on Acoustics Speech and Signal Processing (ICASSP), Mar. 14-19, 2010, 4 pages.

Niesler, T. R., et al., "A Variable-Length Category-Based $N$-Gram Language Model," IEEE International Conference on Acoustics, Speech, and Signal Processing (ICASSP'96), vol. 1, May 7-10, 1996, 6 pages.

Papadimitriou, C. H., et al., "Latent Semantic Indexing: A Probabilistic Analysis," Nov. 14, 1997, http://citeseerx.ist.psu.edu/messages/downloadsexceeded.html, 21 pages.

Parsons, T. W., "Voice and Speech Processing," Linguistics and Technical Fundamentals, Articulatory Phonetics and Phonemics, © 1987 McGraw-Hill, Inc., ISBN: 0-07-0485541-0, 5 pages.

Parsons, T. W., "Voice and Speech Processing," Pitch and Formant Estimation, © 1987 McGraw-Hill, Inc., ISBN: 0-07-0485541-0, 15 pages.

Picone, J., "Continuous Speech Recognition Using Hidden Markov Models," IEEE ASSP Magazine, vol. 7, No. 3, Jul. 1990, 16 pages.

Rabiner, L. R., et al., "Fundamental of Speech Recognition," © 1993 AT&T, Published by Prentice-Hall, Inc., ISBN: 0-13-285826-6, 17 pages.

Rabiner, L. R., et al., "Note on the Properties of a Vector Quantizer for LPC Coefficients," The Bell System Technical Journal, vol. 62, No. 8, Oct. 1983, 9 pages.

Ratcliffe, M., "ClearAccess 2.0 allows SQL searches off-line," (Structured Query Language), ClearAcess Corp., MacWeek Nov. 16, 1992, vol. 6, No. 41, 2 pages.

Remde, J. R., et al., "SuperBook: An Automatic Tool for Information Exploration-Hypertext?," In Proceedings of Hypertext'87 papers, Nov. 13-15, 1987, 14 pages.

Reynolds, C. F., "On-Line Reviews: A New Application of the HICOM Conferencing System," IEE Colloquium on Human Factors in Electronic Mail and Conferencing Systems, Feb. 3, 1989, 4 pages.

Rigoll, G., "Speaker Adaptation for Large Vocabulary Speech Recognition Systems Using Speaker Markov Models," International Conference on Acoustics, Speech, and Signal Processing (ICASSP'89), May 23-26, 1989, 4 pages.

Riley, M. D., "Tree-Based Modelling of Segmental Durations," Talking Machines Theories, Models, and Designs, 1992 © Elsevier Science Publishers B.V., North-Holland, ISBN: 08-444-89115.3, 15 pages.

Rivoira, S., et al., "Syntax and Semantics in a Word-Sequence Recognition System," IEEE International Conference on Acoustics, Speech, and Signal Processing (ICASSP'79), Apr. 1979, 5 pages.

Rosenfeld, R., "A Maximum Entropy Approach to Adaptive Statistical Language Modelling," Computer Speech and Language, vol. 10, No. 3, Jul. 1996, 25 pages.

Roszkiewicz, A., "Extending your Apple," Back Talk—Lip Service, A+ Magazine, The Independent Guide for Apple Computing, vol. 2, No. 2, Feb. 1984, 5 pages.

Sakoe, H., et al., "Dynamic Programming Algorithm Optimization for Spoken Word Recognition," IEEE Transactins on Acoustics, Speech, and Signal Processing, Feb. 1978, vol. ASSP-26 No. 1, 8 pages.

Salton, G., et al., "On the Application of Syntactic Methodologies in Automatic Text Analysis," Information Processing and Management, vol. 26, No. 1, Great Britain 1990, 22 pages.

Savoy, J., "Searching Information in Hypertext Systems Using Multiple Sources of Evidence," International Journal of Man-Machine Studies, vol. 38, No. 6, Jun. 1993, 15 pages.

Scagliola, C., "Language Models and Search Algorithms for Real-Time Speech Recognition," International Journal of Man-Machine Studies, vol. 22, No. 5, 1985, 25 pages.

Schmandt, C., et al., "Augmenting a Window System with Speech Input," IEEE Computer Society, Computer Aug. 1990, vol. 23, No. 8, 8 pages.

Schiltze, H., "Dimensions of Meaning," Proceedings of Supercomputing'92 Conference, Nov. 16-20, 1992, 10 pages.

Sheth B., et al., "Evolving Agents for Personalized Information Filtering," In Proceedings of the Ninth Conference on Artificial Intelligence for Applications, Mar. 1-5, 1993, 9 pages.

Shikano, K., et al., "Speaker Adaptation Through Vector Quantization," IEEE International Conference on Acoustics, Speech, and Signal Processing (ICASSP'86), vol. 11, Apr. 1986, 4 pages.

(56) References Cited

OTHER PUBLICATIONS

Sigurdsson, S., et al., "Mel Frequency Cepstral Coefficients: An Evaluation of Robustness of MP3 Encoded Music," In Proceedings of the 7th International Conference on Music Information Retrieval (ISMIR), 2006, 4 pages.

Silverman, K. E. A., et al., "Using a Sigmoid Transformation for Improved Modeling of Phoneme Duration," Proceedings of the IEEE International Conference on Acoustics, Speech, and Signal Processing, Mar. 15-19, 1999, 5 pages.

Tenenbaum, A.M., et al., "Data Structure Using Pascal," 1981 Prentice-Hall, Inc., 34 pages.

Tsai, W.H., et al., "Attributed Grammar—A Tool for Combining Syntactic and Statistical Approaches to Pattern Recognition," IEEE Transactions on Systems, Man, and Cybernetics, vol. SMC-10, No. 12, Dec. 1980, 13 pages.

Udell, J., "Computer Telephony," Byte, vol. 19, No. 7, Jul. 1, 1994, 9 pages.

van Santen, J. P. H., "Contextual Effects on Vowel Duration," Journal Speech Communication, vol. 11, No. 6, Dec. 1992, 34 pages.

Vepa, J., et al., "New Objective Distance Measures for Spectral Discontinuities in Concatenative Speech Synthesis," In Proceedings of the IEEE 2002 Workshop on Speech Synthesis, 4 pages.

Verschelde, J., "MATLAB Lecture 8. Special Matrices in MATLAB," Nov. 23, 2005, UIC Dept. of Math., Stat.. & C.S., MCS 320, Introduction to Symbolic Computation, 4 pages.

Vingron, M. "Near-Optimal Sequence Alignment," Deutsches Krebsforschungszentrum (DKFZ), Abteilung Theoretische Bioinformatik, Heidelberg, Germany, Jun. 1996, 20 pages.

Werner, S., et al., "Prosodic Aspects of Speech," Université de Lausanne, Switzerland, 1994, Fundamentals of Speech Synthesis and Speech Recognition: Basic Concepts, State of the Art, and Future Challenges, 18 pages.

Wikipedia, "Mel Scale," Wikipedia, the free encyclopedia, http://en.wikipedia.org/wiki/Mel_scale, 2 pages.

Wikipedia, "Minimum Phase," Wikipedia, the free encyclopedia, http://en.wikipedia.orq/wiki/Minimum_phase, 8 pages.

Wolff, M., "Poststructuralism and the ARTFUL Database: Some Theoretical Considerations," Information Technology and Libraries, vol. 13, No. 1, Mar. 1994, 10 pages.

Wu, M., "Digital Speech Processing and Coding," ENEE408G Capstone-Multimedia Signal Processing, Spring 2003, Lecture-2 course presentation, University of Maryland, College Park, 8 pages.

Wu, M., "Speech Recognition, Synthesis, and H.C.I.," ENEE408G Capstone-Multimedia Signal Processing, Spring 2003, Lecture-3 course presentation, University of Maryland, College Park, 11 pages.

Wyle, M. F., "A Wide Area Network Information Filter," In Proceedings of First International Conference on Artificial Intelligence on Wall Street, Oct. 9-11, 1991, 6 pages.

Yankelovich, N., et al., "Intermedia: The Concept and the Construction of a Seamless Information Environment," Computer Magazine, Jan. 1988, © 1988 IEEE, 16 pages.

Yoon, K., et al., "Letter-to-Sound Rules for Korean," Department of Linguistics, The Ohio State University, 2002, 4 pages.

Zhao, Y., "An Acoustic-Phonetic-Based Speaker Adaptation Technique for Improving Speaker-Independent Continuous Speech Recognition," IEEE Transactions on Speech and Audio Processing, vol. 2, No. 3, Jul. 1994, 15 pages.

Zovato, E., et al., "Towards Emotional Speech Synthesis: A Rule Based Approach," 2 pages.

International Search Report dated Nov. 9, 1994, received in International Application No. PCT/US1993/12666, which corresponds to U.S. Appl. No. 07/999,302, 8 pages (Robert Don Strong).

International Preliminary Examination Report dated Mar. 1, 1995, received in International Application No. PCT/US1993/12666, which corresponds to U.S. Appl. No. 07/999,302, 5 pages (Robert Don Strong).

International Preliminary Examination Report dated Apr. 10, 1995, received in International Application No. PCT/US1993/12637, which corresponds to U.S. Appl. No. 07/999,354, 7 pages (Alejandro Acero).

International Search Report dated Feb. 8, 1995, received in International Application No. PCT/US1994/11011, which corresponds to U.S. Appl. No. 08/129,679, 7 pages (Yen-Lu Chow).

International Preliminary Examination Report dated Feb. 28, 1996, received in International Application No. PCT/US1994/11011, which corresponds to U.S. Appl. No. 08/129,679, 4 pages (Yen-Lu Chow).

Written Opinion dated Aug. 21, 1995, received in International Application No. PCT/US1994/11011, which corresponds to U.S. Appl. No. 08/129,679, 4 pages (Yen-Lu Chow).

International Search Report dated Nov. 8, 1995, received in International Application No. PCT/US1995/08369, which corresponds to U.S. Appl. No. 08/271,639, 6 pages (Peter V. De Souza).

International Preliminary Examination Report dated Oct. 9, 1996, received in International Application No. PCT/US1995/08369, which corresponds to U.S. Appl. No. 08/271,639, 4 pages (Peter V. De Souza).

\* cited by examiner

| Pr(A, F) | 0.0324 |
| Pr(F, S, D) | 0.0043 |
| Pr(W, G, S, J) | 0.00083 |
| Pr(A, F, S) | 0.0097 |
| Pr(A, F, S, D) | 0.00052 |
| ⋮ | ⋮ |

408 points to Pr(A, F)

METHOD FOR DISAMBIGUATING MULTIPLE READINGS IN LANGUAGE CONVERSION

BACKGROUND OF THE INVENTION

Statistical language models such as N-gram models are commonly used to convert or translate one language to another by assigning a probability, Pr(W), to a sequence of words W using a probability distribution. Such language models are typically trained from a large body of texts (referred to as a corpus) and, generally, capture the frequencies of the occurrence of each word and/or each sequence of two or more words within the corpus. Conventionally, the occurrence of a particular word in the corpus is accounted for by the training of the language model irrespective of its use and/or reading in each particular context. While most words in the corpus and in general are each associated with one meaning and possibly more than one correct pronunciation, certain words are written identically but have different meanings and pronunciations/readings (i.e., heteronyms). For example, an example of a heteronym in the English language is "desert," which in one context and usage/pronunciation means "to abandon," and in another context and usage/pronunciations means "a dry, barren area of land." Thus, by accounting for the frequency of the word "desert" without regard to the context of its use in a corpus, any distinctions of frequencies of use of the word in the first sense ("to abandon") and a second sense ("a dry, barren area of land") are most likely overlooked by the conventional language model.

Pinyin is a standard method for transcribing Mandarin Chinese using the Roman alphabet. In a pinyin transliteration, the phonetic pronunciations/readings of Chinese characters are mapped to syllables composed of Roman letters. Pinyin is commonly used to input Chinese characters into a computer via a conversion system. Such a system often incorporates a statistical language model to improve conversion accuracy. Certain Chinese characters have multiple pronunciations/readings (i.e., heteronymous Chinese characters). However, the conventional language model that does not distinguish between different pronunciations/readings of heteronyms can sometimes produce undesirable Chinese conversion candidates for pinyin that is associated with heteronymous Chinese characters.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Using a language model that is trained on a corpus that is annotated to distinguish between different readings associated with certain characters is disclosed. In some embodiments, an instance of a character that appears in a corpus that is associated with more than one reading/pronunciation/use/sense is annotated with the reading/pronunciation/use/sense that is appropriate for that instance of the character. In some embodiments, a language model trained on such an annotated corpus is used to convert pinyin into Chinese characters.

Figure 1:
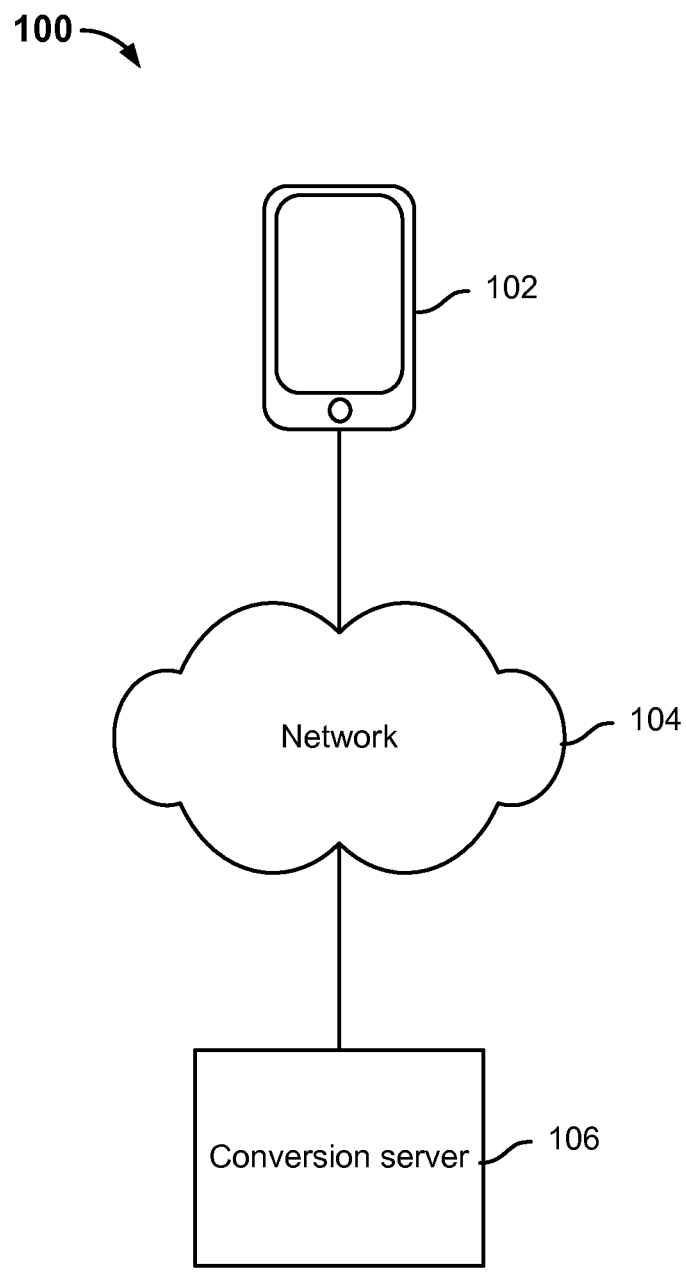
FIG. 1 is a diagram of an embodiment of a system for language conversion.

FIG. 1 is a diagram of an embodiment of a system for language conversion. In the example, system 100 includes device 102, network 104, and conversion server 106. Network 104 can include various high speed data and/or telecommunications networks.

Device 102 is configured to receive input data. In some embodiments, the input data can include input text (e.g., Roman alphabet). For example, the input data can include pinyin. While device 102 is shown to be an iPhone®, other examples of device 102 can be a desktop computer, laptop computer (e.g., MacBook®), smart phone, mobile device, tablet device (e.g., iPad® or iPad 2®), and any other type of computing device. Device 102 is configured to include an input area, in which typed and/or handwritten characters can be captured/received by device 102. Examples of such an input area include a touch screen keyboard (e.g., of a tablet and/or mobile phone device), a physical keyboard, a trackpad (e.g., Apple's Magic Trackpad, or the built-in trackpad of a MacBook Pro), an electronic writing surface, and a touchpad. In various embodiments, a user can select the input at device 102 by interacting with the input area of device 102 (e.g., by typing into the physical and/or touch screen keyboard). In some embodiments, device 102 includes a display area, in which the outputs received from conversion server 106 can be displayed.

In some embodiments, device 102 is configured to send the received input to conversion server 106 via network 104 for conversion server 106 to convert it into an output (e.g., a set of characters) of a target symbolic representation. In some embodiments, device 102 includes logic, code, and/or stored data associated with performing similar conversions and can therefore perform conversions of the input data to outputs of the target symbolic representation without the need to transmit data over network 104 to the remote conversion server 106.

Conversion server 106 is configured to receive data and convert the data into another form (e.g., characters of the target symbolic representation). For example, the target symbolic representation can be Chinese characters. In some embodiments, conversion server 106 can include a language model (e.g., trained from a corpus of Chinese characters) and/or a database that is used to store associations between text of the input data and sets of characters of the target symbolic representation (e.g., an input data to target symbolic representation dictionary). In some embodiments, the outputs of conversion server 106 can include conversion candidates from the input. For example, the candidates of conversions for the output can be a certain number of the most statistically likely (i.e., probable) Chinese characters that are determined from the language model and the input pinyin. In some embodiments, the outputs of conversion server 106 are sent back to and displayed at device 102 (e.g., for a user to view and/or make further selections with respect to the displayed information).

Figure 2:
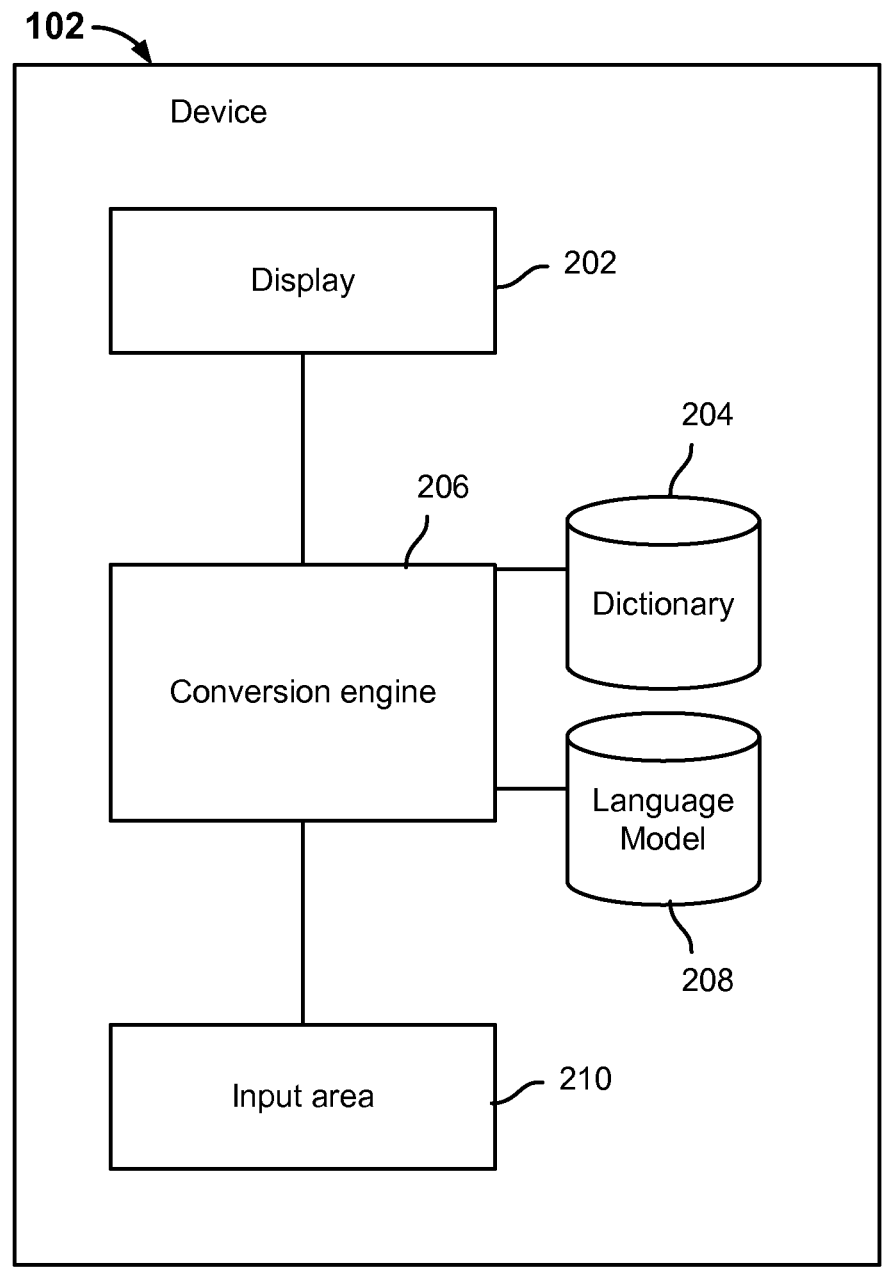
FIG. 2 is a diagram showing an embodiment of a device configured to convert input data to output of a target symbolic representation.

FIG. 2 is a diagram showing an embodiment of a device configured to convert input data to output of a target symbolic representation. In some embodiments, device 102 of system 100 can be implemented using the example of FIG. 2. In some embodiments, the device as illustrated in FIG. 2 includes, locally, one or more functionalities of conversion server 106 such that it can perform conversions without the need to transmit data over a network to a remote server. The shown components (e.g., display 202, conversion engine 206, dictionary 204, language model 208, and input area 210) of the device in the example can be implemented using one or both of hardware and software. In some embodiments, the device can have more or fewer components than those shown in the example.

Input area 210 is configured to capture/receive a set of characters of a first symbolic representation. As mentioned above, examples of input area 210 can include a touch screen keyboard (e.g., of a tablet and/or mobile phone device), a physical keyboard, a trackpad (e.g., Apple's Magic Trackpad, or the built-in trackpad of a MacBook Pro), a receiver (e.g., microphone) associated with a speech recognition/conversion/transcription function, an electronic writing surface, and a touchpad. In some embodiments, input area 210 is configured to receive one or more text characters from the Roman alphabet (e.g., a, b, c, . . . etc.). For example, input area 210 can receive pinyin, which is a system for transliterating Mandarin Chinese in the Roman alphabet. A user can, for example, input pinyin into input area 210 of the device to cause the device to present Chinese conversion candidates that the user can select among to "type" in Chinese on the device. In some embodiments, input area 210 stores the input characters as their corresponding text encoding counterparts. Examples of text encoding schemes include ASCII, Big5, UTF-8, UTF-16, HKSCS, GB18030, and JIS X 0213.

Conversion engine 206 is configured to use the input received from input area 210 and determine conversion candidates of a target symbolic representation. In some embodiments, the target symbolic representation can include Chinese characters. In some embodiments, conversion engine 206 is configured to perform preprocessing on the input before it is converted. For example, if the input were pinyin, then conversion engine 206 can resolve the pinyin into one or more groups of characters that correspond to monosyllables to prepare for mapping each monosyllable to a Chinese conversion candidate because typically, each Chinese character is read/pronounced as a monosyllable. Conversion engine 206 is configured to access dictionary 204 and language model 208. Dictionary 204 can include one or more databases used to store mappings/associations between sets of characters of the input data and sets of characters of the target symbolic representation. Language model 208 can be a N-gram model that is trained on a corpus of text of the target symbolic representation. In some embodiments, the corpus used to train language model 208 was annotated to distinguish between different readings of a heteronymous character of the target symbolic representation. For example, conversion engine 206 can first map the resolved pinyin of the input data to one or more potential Chinese character conversions using dictionary 204 and then retrieve statistical information from language model 208 corresponding to those potential Chinese character conversions to determine which combinations of the candidate conversions are the most likely. The most likely combinations of characters can then be displayed at display 202 (e.g., for the user to view and/or interact with). Examples of display 202 can include a touch screen that can capture interactions from the user or other types of display that cannot capture user interactions.

For example, if the input were the pinyin "nihao," then conversion engine 206 could first resolve the input into the two monosyllabic groups of characters of "ni" and "hao." Because there are many homophones (i.e., words that are pronounced the same but have different meanings) among Chinese characters, each monosyllabic group within the input pinyin can potentially be mapped by dictionary 204 to several possible Chinese characters (each such character can be read with the phonetic pronunciation of the corresponding monosyllabic pinyin group). Then conversion engine 206 can retrieve statistical information related to each of the Chinese characters and/or combinations thereof to determine the combinations of characters that have the highest probabilities of being what was intended by the user.

Figure 3:
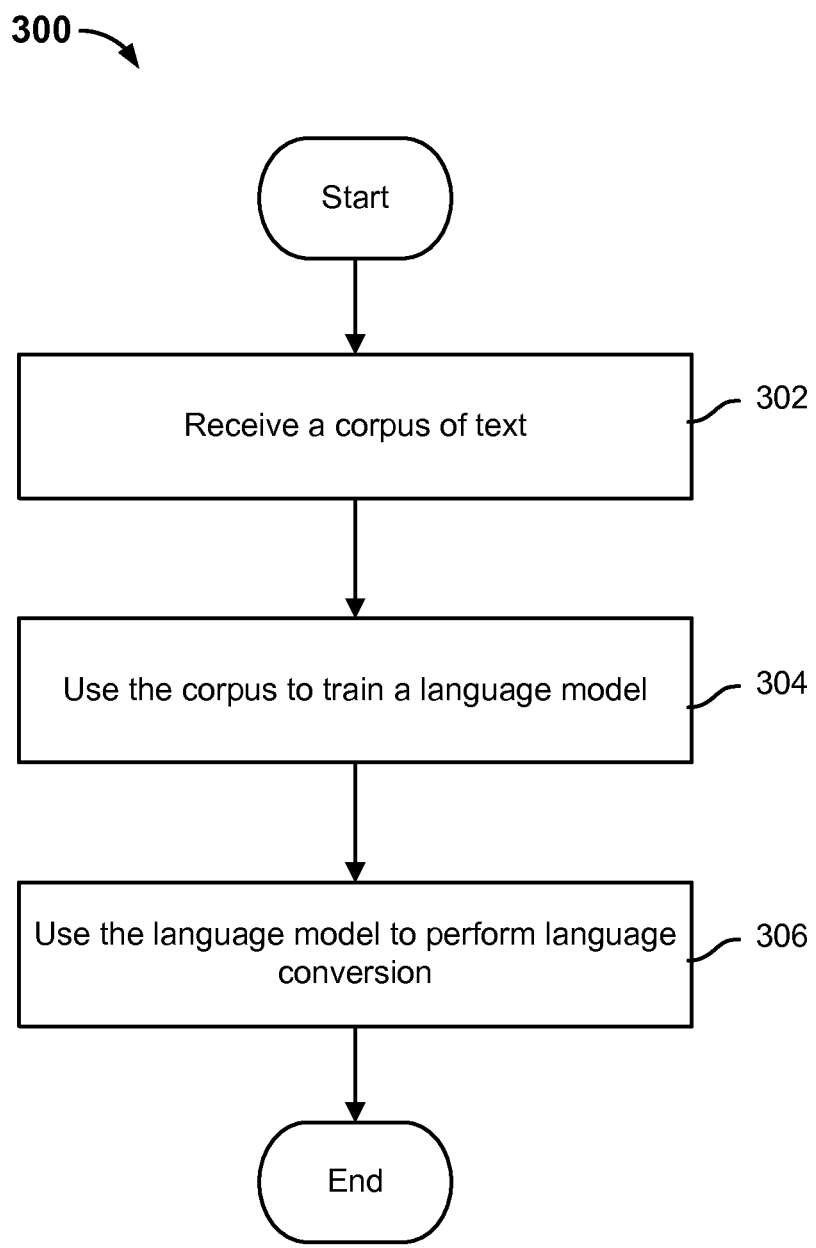
FIG. 3 is a flow diagram showing an embodiment of a process of performing a language conversion.

FIG. 3 is a flow diagram showing an embodiment of a process of performing a language conversion. In some embodiments, process 300 can be implemented at a system that builds a language model and also uses the built language model to perform language conversions.

At 302, a corpus of text is received. A corpus of text can include a large and structured set of texts (e.g., gathered from various sources). The corpus of text can be digitally stored and processed. Typically, the corpus contains text of a single language and/or is of a form similar to the input of the language model that is to be trained on the corpus. For example, for training a language model for a pinyin to Chinese character conversion, the corpus can include text that is in the form of Chinese characters.

At 304, the corpus is used to train a language model. In some embodiments, a language modeling tool (e.g., IRST Language Model Toolkit) can be used to train and build a language model from the corpus. For example, a language modeling tool can generate N-gram probabilities for each of the characters and/or each sequence of characters found in the corpus. For example, each sequence of characters (e.g., of 2 or 3 or more characters in length) that are found in the corpus can be assigned a probability of occurrence. Sequences of characters are analyzed so that the context for a character within a sequence can later be recognized (e.g., during a language conversion phase) by virtue of the context supplied by the adjacent/surrounding characters. So, for a sequence of characters that never appear in the corpus or appears very rarely (e.g., due to typographical errors or lack of meaning), the probabilities generated for those sequences are zero or extremely low (to indicate their unlikelihood to represent a user's desired intent behind an input data). The resulting language model includes, at least, a set of assignments of probabilities to sequences of one or more characters (e.g., or the underlying symbol that represents those characters) that are found in the corpus on which the model was trained. Returning to the example of a corpus of Chinese characters, the resulting language model would include probabilities assigned to sequences of one or more Chinese characters that are found in the corpus.

At 306, the language model is used to perform language conversions. For example, the language model could be used by a conversion engine (e.g., conversion engine 206) or conversion server (e.g., conversion server 106) to convert an input in one form (e.g., speech or text) into one or more outputs of a second form (e.g., a target symbolic representation). In some embodiments, an input data maps to one correct output (e.g., that is desired by the user who entered the input). A more accurate language model can retrieve for a given input data, potential outputs to be converted from the input data that are more likely to include the one output desired by the user. For example, the input data (e.g., correctly spelled pinyin) could be mapped to (e.g., using a dictionary) one or more characters (e.g., Chinese characters) for which statistical information (e.g., probabilities) are maintained by the language model. The retrieved probabilities are then used to determine which of the characters that potentially map to the input are more likely to be an accurate mapping. In some embodiments, a language model includes other statistical tools to match an input to an output, such a character-level and/or word-level and/or sentence (e.g., beginning of sentence and end of sentence) and/or phrase-level resolutions from the input data to the target symbolic representation.

Figures 4A, 4B:
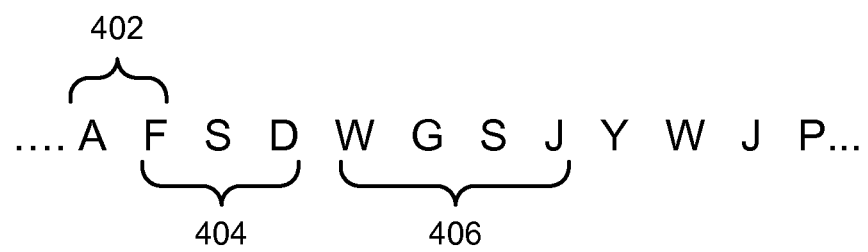
FIG. 4A shows an example of a sequence of text that is found in a corpus.
FIG. 4B shows an example of some data stored at a language model that was trained from a corpus from which the text of FIG. 4A was found.

FIGS. 4A and B are examples that illustrate some steps in the creation and use of a language model.

FIG. 4A shows an example of a sequence of text that is found in a corpus. As used in the example, each of the characters (e.g., A, F, S . . . etc) can be used to represent a character or word in any language; capitalized Roman letters were merely chosen for exemplary purposes. For example, each of the characters shown in FIG. 4A could represent a Chinese character that appears in the Chinese character corpus. The text of the corpus can be broken into N-grams (e.g., sequences of characters that are of N characters in length) during the training of the language model. Subsequences or N-grams 402 (that includes "A F"), 404 (that includes "F S D"), and 406 (that includes "W G S J") are some examples of sequences found in the corpus that can be used in the N-gram probability generation and/or training phase of building a language model. The character length of sequences for which N-gram probabilities are to be generated for a particular language model can be selected by the language modeling tool and/or the designer of the language model, for example.

FIG. 4B shows an example of some data stored at a language model that was trained from a corpus from which the text of FIG. 4A was found. As shown in the example, the probabilities of various sequences (of varying lengths) found in the corpus haven been calculated and stored (e.g., in a table entry) that corresponds to its respective character sequence. For example, 408 represents the entry in the exemplary table that indicates the N-gram probability (0.0324) assigned by the language model for the occurrence of the sequence of "A F" in the corpus. In some embodiments, a language model can include other types of information besides the exemplary data shown in FIG. 4B (e.g., a input data to target symbolic representation dictionary, words, units of several characters, and CLASSES of information like names and places).

In some embodiments, input data (e.g., a set of characters related to a first symbolic or other representation) can be converted using a language model to yield output data (e.g., a set of characters that form one or more conversion candidates that relate to a target symbolic representation). For example, a language model can be used to convert pinyin text input via an input device to corresponding Chinese characters. The input pinyin character sequences are parsed to determine syllables that can be mapped to one or more potential Chinese characters (e.g., by a language model or some other technique) and the respective probabilities of such Chinese characters can be used to determine the more probable Chinese character conversions that serve as the desired mapping from the input pinyin.

Generally, while a conventional corpus of characters may include certain annotations (e.g., part of speech tagging), it typically does not include annotations of a character's reading/pronunciation/use/sense (sometimes referred to herein as just "reading") or a particular reading/pronunciation/use/ sense (if there are more than one possible readings/pronunciations/uses/senses associated with the character) for the context in which the character is used. For example, a conventional corpus of Chinese characters does not typically include annotations of reading/pronunciation/sense/pinyin counterpart. Put another way, the conventional Chinese character corpus does not distinguish between the multiple readings of a heteronymous Chinese character, where each reading is appropriate for a different context. For example, a context in one portion of the corpus may use a heteronymous character in a first sense (reading/pronunciation/pinyin counterpart), while a context in another portion of the same corpus may use the heteronymous character in a second sense (reading/pronunciation/pinyin counterpart) that is different from the first sense. However, without annotations in the corpus to distinguish between the two (or more) senses of the heteronymous character, then the N-gram probability generation will be performed for just that heteronymous character (that encompasses multiple readings) based on any time that character appears in the corpus, rather than a separate sense-specific probability being determined for each reading of that heteronymous character based on each time a particular reading of that heteronymous character appears in the corpus. As a result of failing to distinguish between the possible multiple readings of certain characters in a conventional corpus, a language model trained using such a corpus may be less accurate in converting a data input into an output that includes a heteronymous character. Disambiguating between different readings of a character in the language model is disclosed, as will be discussed below.

Figure 5:
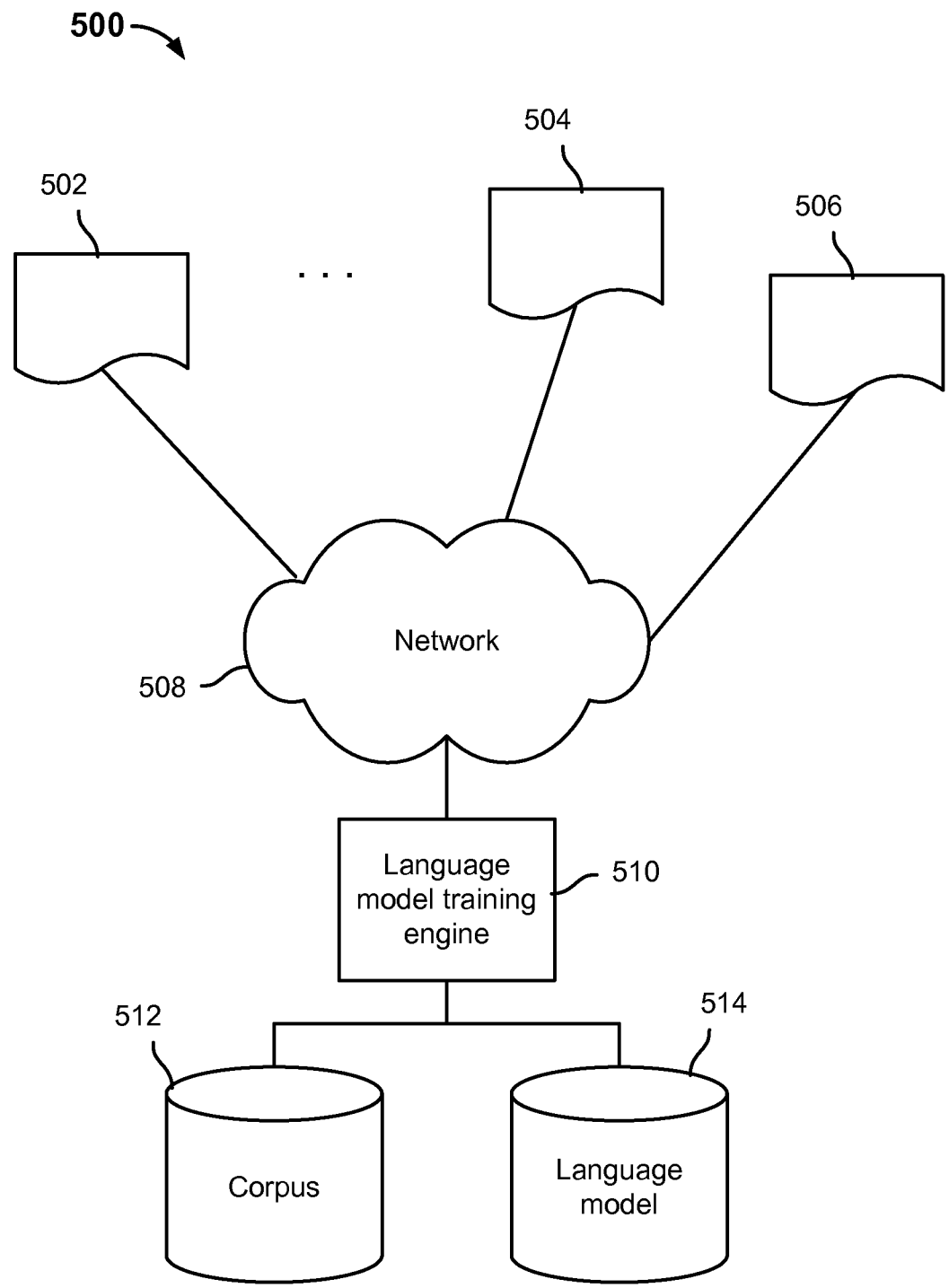
FIG. 5 is a diagram showing an embodiment of a system for creating an annotated corpus to be used to train a language model to be used for language conversion.

FIG. 5 is a diagram showing an embodiment of a system for creating an annotated corpus to be used to train a language model to be used for language conversion. In various embodiments, the annotation of the corpus facilitates distinguishing between one use of a heteronym to indicate a first reading/pronunciation/pinyin/sense in the corpus and another use of the same heteronym to indicate a second reading/pronunciation/pinyin/sense in the corpus. Network 508 can include various high speed data and/or telecommunications networks. In some embodiments, language model training engine 510, corpus 512, and language model 514 can be implemented as a part of a conversion server (e.g., conversion server 106).

In some embodiments, language model training engine 510 retrieves text sources 502, 504, and 506 over the network 508 from, for example, servers hosted by third parties. In some embodiments, language model training engine 510 receives text without the use of network 508 (e.g., by obtaining text through a local storage or source). In some embodiments, language model training engine 510 is configured to store retrieved and/or received text at corpus 512. Corpus 512 is formed with text extracted from various sources, such as text source 502, text source 504, and text source 506. In some embodiments, text gathered at corpus 512 includes, predominantly, text of one language. For example, the text of corpus 512 can be predominantly in Chinese characters. Examples of the text sources 502, 504, and 506 include newspapers, websites, books, periodicals, social media (e.g., Facebook®, Twitter®), and journals. For example, the text collected from text sources 502, 504, and 506 can total around 800 million Chinese characters. Also for example, a corpus of Chinese characters could include 8000 different characters, with around 50 of them being heteronymous characters. In some embodiments, without annotation of corpus 512, each distinct character that is extracted from the text sources is represented by one distinct symbol in corpus 512 and the same character that is extracted multiple times from the text sources is stored as multiple instances of the symbol corresponding to that character.

In some embodiments, language model training engine 510 is configured to receive manual annotations to characters in corpus 512. In some embodiments, a system administrator and/or designer (e.g., a human user) of language model 514 scans the text of corpus 512 to find heteronymous characters and based on the user's understanding of the context in which a heteronymous character is used (e.g., based on the sentence in which the character was used and/or the surrounding text), annotates that instance of the heteronymous character to indicate its appropriate reading/pronunciation/pinyin/sense. For example, to perform such an annotation, an instance of a heteronymous character of a particular reading (of two or more possible readings) can be replaced with a new symbol (e.g., text encoding) in corpus 512 that is distinguishable from the symbols that represent all of the other characters present in corpus 512 and also distinguishable from another symbol that is associated with another reading of that same heteronymous character. Put another way, a heteronymous character with one reading in corpus 512 will be associated with a first symbol in corpus 512 and the same heteronymous character with a second reading will be associated with a second symbol in corpus 512. So, when the heteronymous character is used in a context associated with the first reading, that instance of the character will be stored as the first symbol in corpus 512 and when the heteronymous character is used in a context associated with the second reading, that instance of the character will be stored as the second symbol. As a consequence of the annotation, a heteronymous character will no longer appear throughout corpus 512 as various instances of the same symbol, but rather each different reading of a heteronymous character will be replaced by a distinct symbol in the corpus. So, for example, a heteronymous character that is associated with three possible readings could appear throughout corpus 512 as various instances of three different symbols in the annotated corpus. In some embodiments, while more than one symbol can represent a heteronymous character in the corpus, each of those symbols is still associated with the same heteronymous character.

For example, in such an annotated corpus for English words, "desert" is a heteronymous word/character with two possible readings: one, a verb, meaning "to abandon", which is associated with one meaning, and one, a noun, meaning "a dry, barren area of land", which is associated with a different meaning. Prior to the annotation of the corpus, an appearance of the "desert" in the text of the corpus would be associated with a symbol for "desert." But after the annotation, the appearance of the "desert" in the corpus would be associated with either the symbol for the verb or the noun, depending on which of the two meanings for "desert" is appropriate for the context in which that instance of "desert" appears in the text.

In some embodiments, one of the possible readings of a word or the symbol or sequence of symbols is represented by the original symbol used to encode the symbol for all occurrences, and only instances associated with one or more other possible readings are annotated. In the foregoing example, for example, "desert" used in a manner associated with desert_v (the verb, meaning "to abandon") would not be annotated, but for instances of "desert" used in the sense of desert_n (the noun, meaning "a dry, barren area of land") the symbol used to encode "desert" would be replaced with a newly defined symbol corresponding to desert_n (meaning "a dry, barren area of land"). Subsequently, in training the language model occurrences of "desert" un-annotated would be understood to be associated with desert_v (meaning "to abandon"), whereas occurrences of desert_n (meaning "a dry, barren area of land") would be understood to refer to the second reading.

In some embodiments, the user manually annotates a subset of the text of corpus 512 and the remainder of corpus 512 is annotated automatically (e.g., using machine learning techniques in the form of software and/or hardware) in a similar manner, for example, based on the pattern of annotations created by the manual annotations. For example, an automatic process can, using the patterns learned from the manual annotations, identify a first context for a heteronymous character and the corresponding appropriate reading of that character in that context and annotate that instance of the character in the corpus to be associated with that particular reading of the character (e.g., by replacing a symbol associated with the heteronymous character in the corpus to be a symbol that is distinct from a symbol that represents another reading of that character and distinct from a symbol that represents another character in corpus 512).

One way to consider corpus 512 after it has been annotated is that the symbol set becomes expanded; whereas prior to the disclosed annotation, a heteronymous character maps to one machine readable value, such as a Unicode codepoint or other value, that is used to represent the character in a machine intelligible manner, subsequent to the disclosed annotation, a heteronymous character maps to more than one machine readable value used in annotated corpus 512, where each machine readable value associated with a heteronymous character represents a particular reading of the heteronymous character.

In some embodiments, language model 514 is trained on annotated corpus 512 using, for example, a language modeling tool (e.g., IRST Language Model Toolkit). For example, the language modeling tool can generate N-gram probabilities on the characters (or their symbols thereof) and sequence of characters, including the new symbols added for the multiple readings of heteronymous characters, of annotated corpus 512.

In some embodiments, a conversion engine such as conversion engine 206 of FIG. 2 is configured to receive an input data to generate, using a language model trained on a reading-annotated corpus, such as language model 514, one or more conversion candidates in a target symbolic representation. For example, assume that an input data is associated with pinyin and language model 514 is associated with Chinese characters. Then using the probabilities generated for the characters/symbols and sequences thereof in language model 514, conversion engine 206 can generate as output one or more Chinese characters that are relatively more likely to match the given pinyin input and specifically to avoid overestimating the likelihood that a particular heteronymous character was intended by using a model that provides probabilities specific to a particular reading of a heteronymous character.

Figure 6:
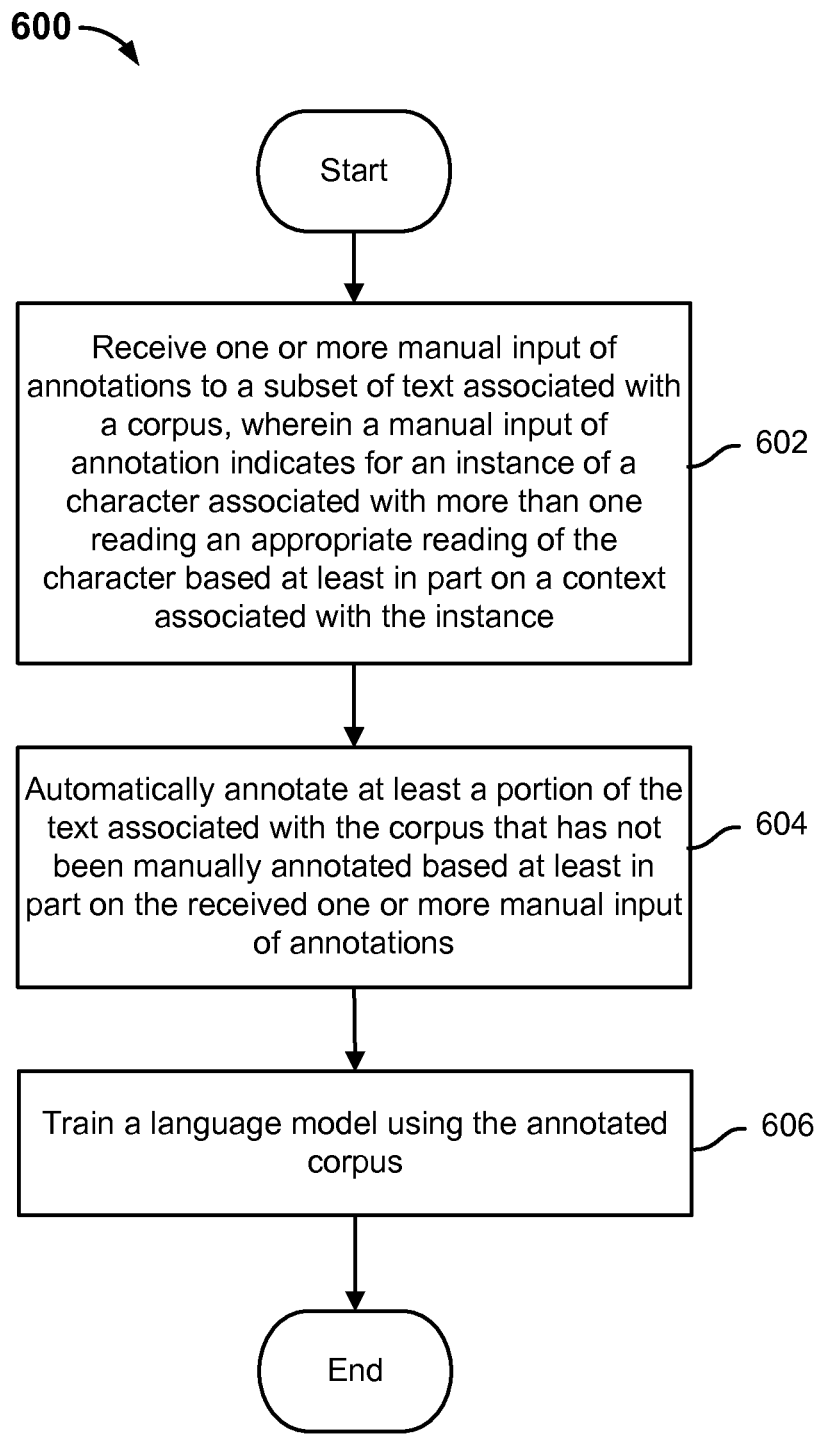
FIG. 6 is a flow diagram showing an embodiment of a process for annotating and using a language model.

FIG. 6 is a flow diagram showing an embodiment of a process for annotating and using a language model. In some embodiments, process 600 can be implemented, at least in part, using system 500.

At 602, one or more manual input of annotations to a subset of text associated with a corpus are received, wherein a manual input of annotation indicates for an instance of a character associated with more than one reading an appropriate reading of the character based at least in part on a context associated with the instance.

For example, a user can read through a subset of the text of a corpus to locate instances of a heteronymous character/word. Upon finding an instance of a heteronymous character/word, the user can determine and annotate the appropriate reading for that instance of the character based on the context (e.g., the sentence the character appears in, the characters that surround that character) in which the instance of the character appears and the user's knowledge of the usage of the character in that context. Rarely, if ever, is more than one reading of a heteronymous character appropriate for an instance of the character in the corpus. As such, there only needs to be one determined reading for each instance of a heteronymous character in the corpus. This determined appropriate reading for an instance of the heteronymous character can be entered into a conversion engine as an annotation and also stored in the corpus. In some embodiments, the annotation associated with an instance of a heteronym to indicate its particular reading can be stored as a new symbol (e.g., one that is different from a symbol used to represent any other character in the corpus and also different from a symbol used to represent another reading of the same heteronymous character, such as a previously unassigned Unicode value or private Use Area character) in the corpus that replaces the symbol (e.g., text encoding) in the corpus that represented the original instance of the character. In some embodiments, the annotation associated with an instance of a heteronym to indicate its particular reading can be a tag that is added to the symbol that represents that instance of the character in the corpus. In some embodiments, the corpus can include texts (mostly of one language) obtained from various sources.

Because it would be inefficient to manually annotate the entire corpus (which could include hundreds of millions of text), manual annotation can be performed for a small subset of the corpus and the remainder of the corpus could be annotated using an automated process, as described below.

At 604, at least a portion of the text associated with the corpus that has not been manually annotated is automatically annotated based at least in part on the received one or more manual input of annotations.

In some embodiments, an automated process can be used to add annotations to various different readings of instances of heteronymous characters throughout the remainder of the corpus that have not yet been manually annotated. For example, the automated process can be created with software that uses machine learning techniques and the manual annotations input at 602.

At 606, a language model is trained using the annotated corpus.

In some embodiments, the annotated corpus includes distinct symbols to represent different readings of each instance of a heteronymous character that occurred in the corpus before it was annotated. In some embodiments, a language model is created and trained on the annotated corpus by performing N-gram probability generation on the characters/symbols and sequences thereof found in the annotated corpus. In some embodiments, the language model can also be trained on the beginning and ending of sentences that are found within the corpus. The resulting language model will include probabilities associated with each reading of a heteronymous character.

For example, assume that in an annotated corpus, the occurrence of the heteronym "word" through the text is represented by either the symbol of "word_reading1" or "word_reading2." As such, the language model that is trained on the annotated corpus would include probabilities that include the character/symbols of "word_reading1" or "word_reading2" (e.g., Pr(word_reading1) can be used to represent the probability associated with the unigram of "wording_reading1" and Pr(word_reading2) can be used to represent the probability associated with the unigram of "word_reading2"; probabilities associated with N-grams such as Pr(wordN, wordN−1, . . . , word_reading1) and Pr(wordN, wordN−1, . . . , word_reading2) can also be generated).

For example, for the heteronymous word "desert" that has two readings, separate probabilities can be determined for each reading. For instance, probabilities for associated with a unigram, bigram, . . . N-gram can be determined for "desert_v" (e.g., Pr(desert_v), Pr(he, would, desert_v), Pr(soldier, said, he, would, desert_v)) and for probabilities for associated with a unigram, bigram, . . . N-gram can be determined for "desert_n" (e.g., Pr(desert_n), Pr(crossed, through, a, desert_n), Pr(camel, crossed, through, a, desert_n)). By taking probabilities of sequences (longer than one character in length), a character can be disambiguated using such probabilities to determine an appropriate context in which the character could appear.

Figure 7A:
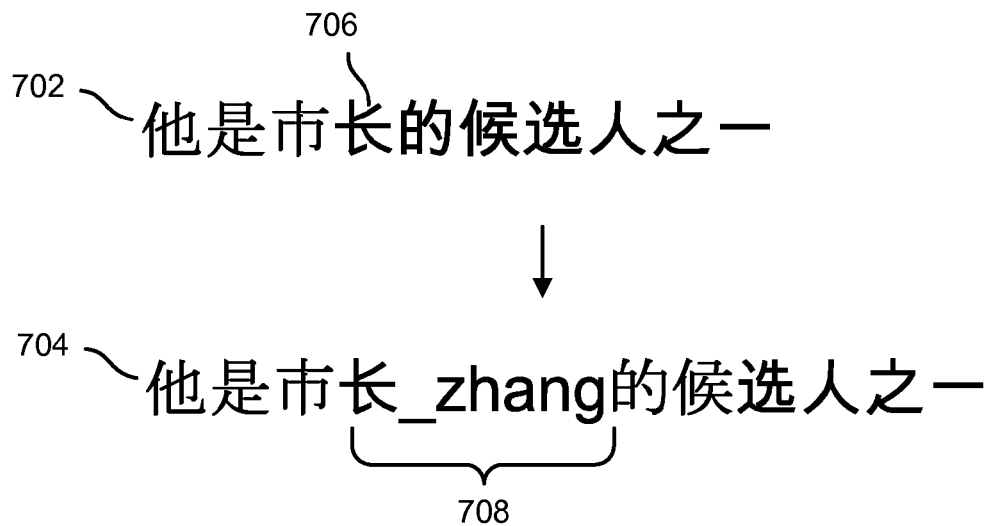
FIG. 7A is an example that shows sentence 702 that appears in a corpus that includes no annotations for heteronymous characters and sentence 704 that appears in a corpus that does include annotations for heteronymous characters.

FIGS. 7A and B are examples of text in a Chinese corpus that is annotated to distinguish between different readings of a heteronymous Chinese character. While corpora of Chinese characters are shown in these examples, the corpus can instead include characters of a different language (e.g., Japanese).

FIG. 7A is an example that shows sentence 702 that appears in a corpus that includes no annotations for heteronymous characters and sentence 704 that appears in a corpus that does include annotations for heteronymous characters. In sentence 702, heteronymous character 706 ("长") is a heteronymous character that is associated with at least the two different readings/pronunciations/pinyin/senses of: "zhang" and "chang." The meaning of the "长" when read as "zhang" means "a chief or leader," for example. The meaning of the "长" when read as "chang" means "long," for example. The English translation of sentence 702 (in the corpus that includes no annotations for heteronymous characters) is "he is one of the candidates running for mayor." As such, in sentence 702, character 706 ("长") is used in the sense that is associated with the reading/pinyin of "zhang." In the corpus that includes no annotations for heteronymous characters, the appearance of character 706 ("长") in sentence 702 would map to one symbol (e.g., using some form of text encoding of "长") in the corpus. However, after performing annotations, sentence 702 becomes sentence 704, which would appear in a corpus that does include annotations for heteronymous characters. In sentence 704, the character ("长") is now replaced with a symbol in the corpus that represents reading 708 ("长_zhang") (e.g., using some form of text encoding that is newly created for "长_zhang" or a text encoding that was not previously used for any other character that appears in the corpus).

Figure 7B:
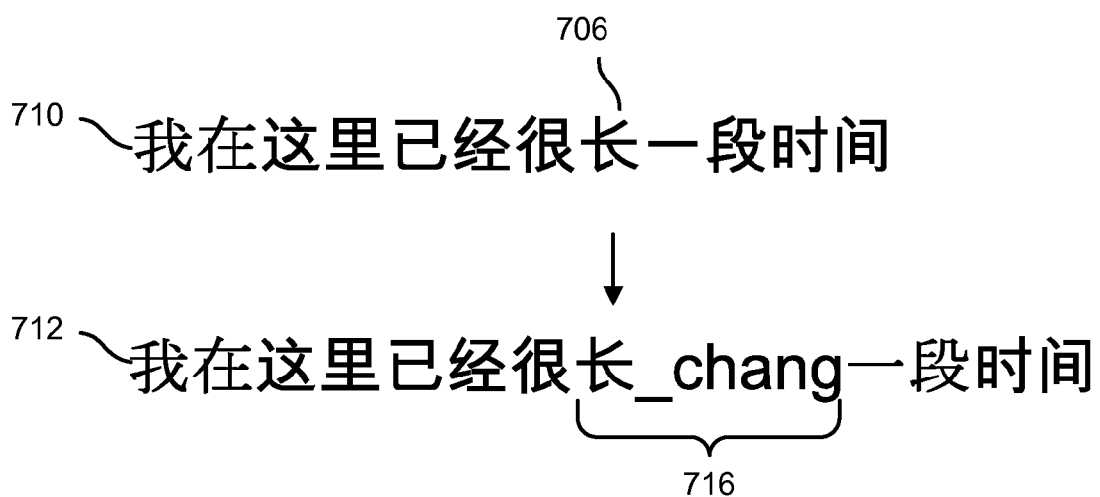
FIG. 7B is an example that shows sentence 710 that appears in a corpus that includes no annotations for heteronymous characters and sentence 712 that appears in a corpus that does include annotations for heteronymous characters.

FIG. 7B is an example that shows sentence 710 that appears in a corpus that includes no annotations for heteronymous characters and sentence 712 that appears in a corpus that does include annotations for heteronymous characters. The English translation of sentence 710 in the corpus that includes no annotations for heteronymous characters is "I have been here for a long time already." As such, in sentence 710, character 706 ("长") is used in the sense that is associated with the reading/pinyin of "chang." In the corpus that includes no annotations for heteronymous characters, the appearance of heteronymous character 706 ("长") in sentence 710 would map to one symbol (e.g., using some form of text encoding of "长") in the corpus. However, after performing annotation, sentence 710 becomes sentence 712, which would appear in a corpus that does include annotations for heteronymous characters. In sentence 712, the character ("长") is now replaced with a symbol in the corpus that represents reading 716 ("长_chang") (e.g., using some form of text encoding that is newly created for "长_chang" or a text encoding that was not previously used for any other character that appears in the corpus).

Figure 8A:
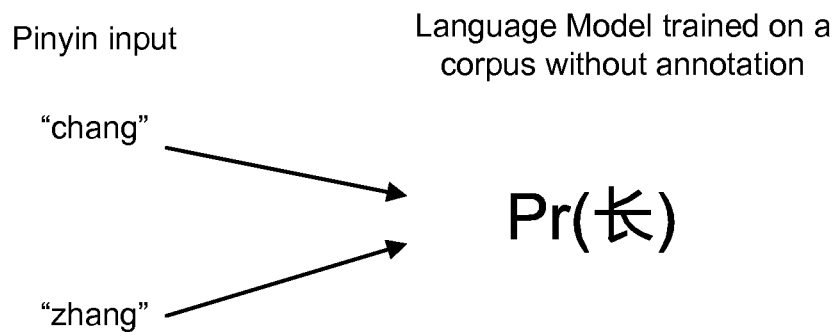
FIG. 8A shows an example of using a Chinese character corpus that has not been annotated for heteronymous characters ("a corpus without annotation").

FIGS. 8A and B illustrate examples of using the corpus that has not been annotated for heteronymous characters and one that has been annotated for heteronymous characters in converting a pinyin input to some form of Chinese character output. While corpora of Chinese characters are shown in these examples, the corpus can instead include characters of a different language (e.g., Japanese). In the examples of FIGS. 7A and B, a pinyin input can be received at an input area of a device (e.g., device 102).

In the example, heteronymous character "长" is associated with the two potential readings/pinyin of "chang" and "zhang."

FIG. 8A shows an example of using a Chinese character corpus that has not been annotated for heteronymous characters ("a corpus without annotation"). In this example, regardless of whether pinyin "chang" or "zhang" is input, the language model that has been trained on the corpus without annotation will (e.g., after the pinyin has been mapped to the potential Chinese conversion candidate of "长") retrieve a probability that is associated with "长," such as the probability of, for example, the unigram "长" (Pr(长)). Although a probability that is associated with a sequence of characters (e.g., N-grams where N>1) that includes "长" (e.g., Pr(小, 长)) can also be retrieved. As a result, the language model may be less accurate in providing statistical information to differentiate between phrases and/or sentences that use "长" in the reading/sense of "zhang" (meaning "a chief") and in the reading/sense of "chang" (meaning "long").

Assume, for example, that "长" in the reading/sense of "zhang" is much less frequently used in the corpus than other Chinese characters that are also associated with the pinyin of "zhang" (e.g., 章, 掌). However, the resulting language model trained on the corpus would attribute the same probabilities to "长" (e.g., corresponding to N-grams that include "长") regardless of how many senses it was used within the corpus. Because the probabilities assigned to "长" could include at least some uses of "长" in the reading/sense of "chang" in the corpus, the probabilities of "长" in the language model could be incorrectly higher relative to the probabilities associated with other Chinese conversion candidates that map to the pinyin of "zhang," which could lead to an overall lower accuracy in language conversion.

Figure 8B:
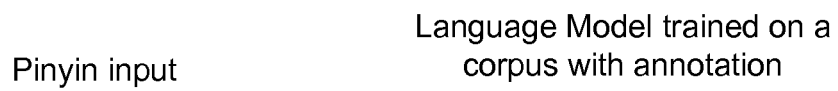
FIG. 8B shows an example of using a Chinese character corpus that has been annotated for heteronymous characters ("a corpus with annotation").

FIG. 8B shows an example of using a Chinese character corpus that has been annotated for heteronymous characters ("a corpus with annotation"). In this example, for a pinyin input of "chang" (e.g., after the pinyin has been mapped to the potential Chinese conversion candidate of "长"), the language model will retrieve probabilities associated with that reading of the character, such as the probability of, for example, the unigram of "长_chang" (Pr(长_chang)). Although a probability that is associated with a sequence of characters (e.g., N-grams where N>1) that includes "长_chang" (e.g., Pr(市, 长_chang)) can also be retrieved. Similarly, for a pinyin input of "zhang," the language model will retrieve a probability associated with that reading of the character, such as the probability of, for example, the unigram of "长_zhang" (e.g., Pr(长_zhang)). As a result of annotating the corpus on which the language model is trained, probability can be attributed to each different reading of the same heteronym, which could allow more accurate conversions.

Returning to the former example where it was assumed that "长" in the reading/sense of "zhang" is much less frequently used in the corpus than other Chinese characters that are also associated with the pinyin of "zhang" (e.g., 章, 掌), now after training the language model on the corpus with annotation, there are separate probabilities attributed to the different readings ("chang" and "zhang") of "长." Now, a probability assigned to "长_zhang" would not include any uses of "长" in the "chang" sense within the corpus, and similarly, a probability assigned to "长_chang" would not include any uses of "长" in the "zhang" sense within the corpus. As such, the probabilities of "长" in the language model would be more accurate relative to the probabilities associated with other Chinese conversion candidates that map to the pinyin of "zhang" or "chang," which could lead to an overall higher accuracy in language conversion.

Figure 9:
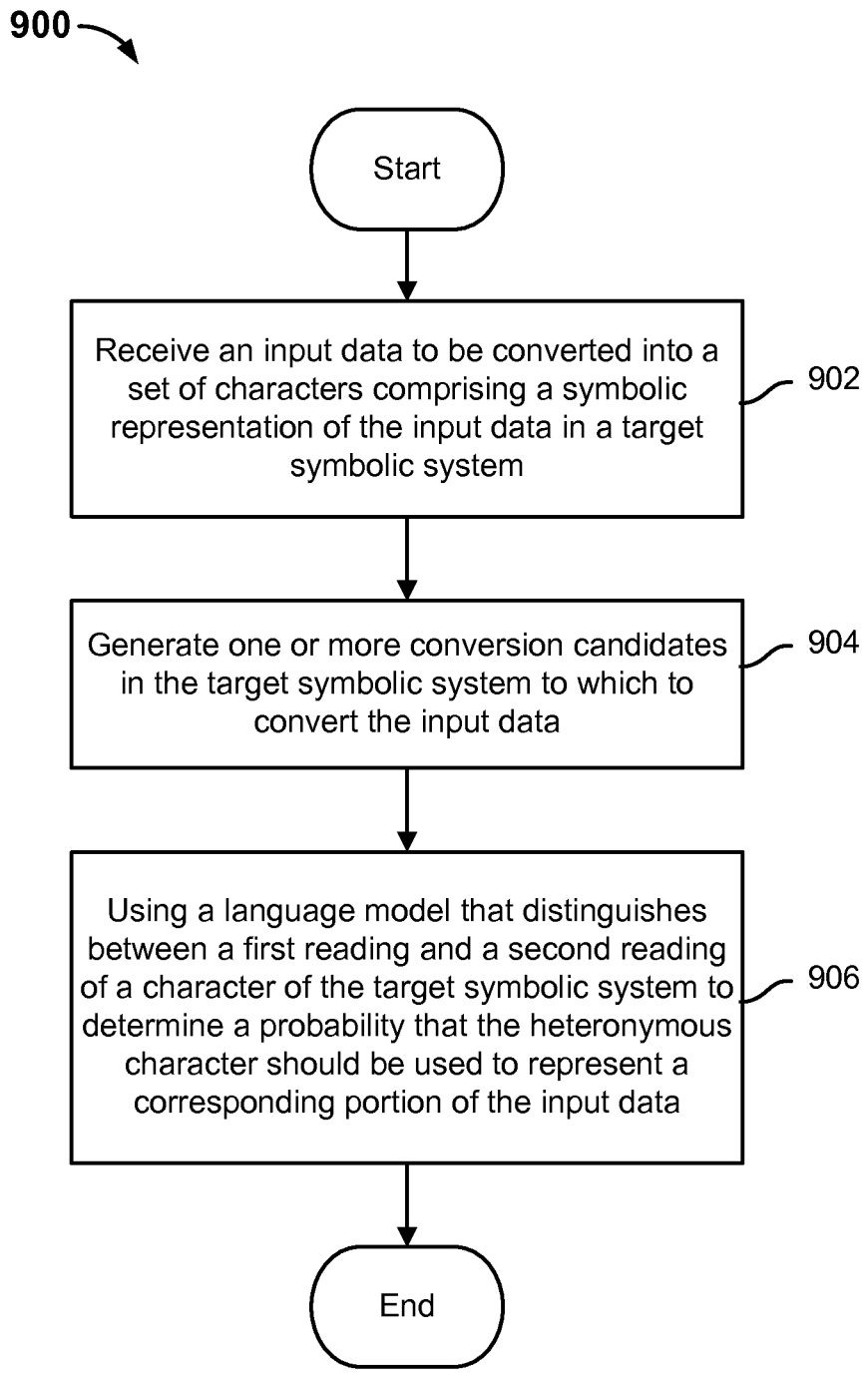
FIG. 9 is a flow diagram showing an embodiment of a process of language conversion.

FIG. 9 is a flow diagram showing an embodiment of a process of language conversion. In some embodiments, process 900 can be implemented, at least in part, on system 100. In some embodiments, process 900 can be implemented, at least in part, at device 102.

At 902, an input data to be converted into a set of characters comprising a symbolic representation of the input data in a target symbolic system is received. In some embodiments, the input data is received at a device (e.g., device 102), where the conversion is to take place. In some embodiments, the input data is sent to a remote server (e.g., conversion server 106), which is to perform the conversion. In some embodiments, the input data comprises input text (e.g., of the Roman alphabet). For example, the input data can be a set of pinyin.

At 904, one or more conversion candidates in the target symbolic representation from which to convert the input data are generated. In some embodiments, the target symbolic representation comprises Chinese characters. In some embodiments, the input data, or a subset thereof, maps to one or more possible characters (e.g., conversion candidates) of the target symbolic representation. For example, assuming that the input data is associated with phonetic readings, multiple characters of the target symbolic representation could map to one reading associated with a group of characters of the input data. In some embodiments, a dictionary of characters (or sets thereof) of the form of the input data to characters (or sets thereof) of the target symbolic representation is used to determine conversion candidates based on the received input data. In some embodiments, the input data could map to a conversion candidate that is a heteronymous character of the target symbolic representation because, for example, the input data or a portion thereof form one of the readings associated with that character.

At 906, a language model that distinguishes between a first reading and a second reading of a character of the target symbolic system is used to determine a probability that the heteronymous character should be used to represent a corresponding portion of the input data. In various embodiments, the language model used is trained on a corpus that is annotated for heteronymous characters (e.g., using at least part of process 600). As a result, the language model was trained to distinguish between different readings of a heteronymous character that were found in the annotated corpus. In some embodiments, the language model associates each reading of a heteronymous character with a set of one or more probabilities (e.g., associated with a unigram, bigram, trigram and so forth, including that reading). For example, in evaluating the conversion candidates, their associated probabilities (e.g., of unigrams, bigrams, trigrams . . . etc) are used by the language to determine which of the conversion candidates have the highest relative probabilities (e.g., for a given context/based on adjacent or surrounding characters). Conversion candidates with relatively higher probabilities are more likely to be the desired conversion output. For example, if one of the conversion candidates were a heteronymous character (e.g., because at least a portion of the input data form one of the readings associated with that character), then in evaluating that conversion candidate, the probabilities associated with that particular reading (e.g., of unigrams, bigrams, trigrams and so forth, that include that particular reading) of the heteronymous character are retrieved and used to compare against probabilities associated with other conversion candidates.

Figure 10:
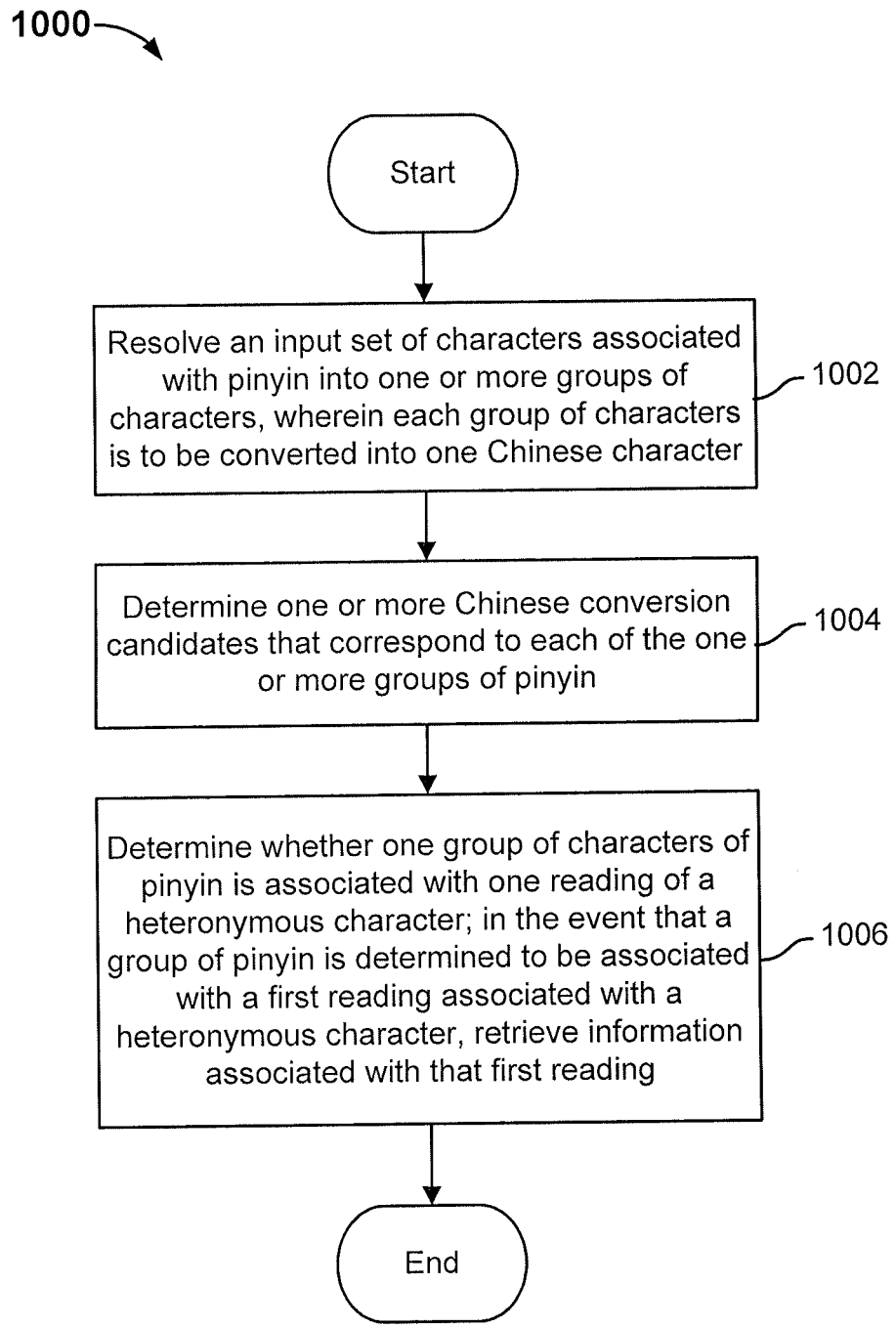
FIG. 10 is a flow diagram showing an embodiment of a process for converting pinyin to Chinese characters.

FIG. 10 is a flow diagram showing an embodiment of a process for converting pinyin to Chinese characters. In some embodiments, process 1000 can be implemented using system 100. In some embodiments, at least part of process 900 (e.g., 904 and 906) can be implemented using process 1000.

At 1002, an input set of characters associated with pinyin is resolved into one or more groups of characters, wherein each group of characters is to be converted into one Chinese character. In some embodiments, the set of characters associated with pinyin is received at an input area of a device (e.g., device 102). In some embodiments, the input pinyin is to be converted into one or more than one Chinese characters. In some embodiments, the input pinyin (e.g., a string of Roman letters, with or without one or more spaces between at least some of the letters) is correctly spelled. Usually, each Chinese character is usually monosyllabic and so maps to a group of adjacent letters in the pinyin input that is read as a monosyllable. So, before the input pinyin can be mapped to Chinese conversion candidates, in some embodiments, it must be resolved into groups of letters that are read as monosyllables.

For example, assume that an input pinyin is "shizhang." The input includes two syllables ("shi" and "zhang") and so is resolved into two monosyllabic groups of letters: "shi" and "zhang."

At 1004, one or more Chinese conversion candidates that correspond to each of the one or more groups of pinyin are determined. In the Chinese language, there are several homophonous Chinese characters, which are characters that are read/pronounced the same but differ in meaning Homophonous characters will be associated with the same pinyin. In the process of converting pinyin to Chinese characters, several homophonous characters (e.g., with the same or different tones) can be identified for each monosyllabic pinyin group. However, only one character is the desired conversion for a group of pinyin. This desired character can be obtained by using a language model that associates one or more probabilities associated with the each Chinese conversion candidate to determine which one or more conversion candidates are associated with the highest probabilities.

Continuing with the previous example, Chinese conversion candidates for "shi" include "是," "市," and "†," for example. Chinese conversion candidates for "zhang" include "章," "掌," and "长," for example.

At 1006, whether one group of characters of pinyin is associated with one reading of a heteronymous Chinese character is determined; in the event that a group of pinyin is determined to be associated with a first reading associated with a heteronymous character, information associated with that first reading is retrieved. In some embodiments, it is determined whether one or more of the resolved monosyllabic groups of pinyin is associated with one reading of a heteronymous character. If such a group is determined, then the probability associated with that reading of the heteronymous character is retrieved and used (e.g., by the language model trained on a corpus annotated to distinguish between different readings of heteronymous Chinese characters) to evaluate the corresponding Chinese conversion candidate.

Continuing with the previous example, it can be determined that the pinyin of "zhang" is associated with one reading of the heteronymous character "长" and so in evaluating Chinese conversion candidates for "shi" and "zhang," the probabilities associated with "长_zhang" can be retrieved (e.g., Pr(长_zhang)). Furthermore, assuming that the input "shizhang" is used to form one phrase (comprising two Chinese characters), then probabilities associated with various combinations of the Chinese conversion candidates of "shi" and "zhang" (e.g., Pr(是, 章), Pr(是, 掌); Pr(是, 长_zhang); Pr(市, 章); Pr(市, 掌); Pr(市, 长_zhang); Pr(†, 章); Pr(†, 掌); Pr(†, 长_zhang); Pr(†, 章); Pr(†, 掌); Pr(†, 长_zhang)) are evaluated to determine the combination with the highest probability. Assuming that the corpus was properly annotated and that the language model was properly trained, of the probabilities associated with the possible combinations of the Chinese conversion candidates, the value of Pr(i=市, 长_zhang) should be the greatest (e.g., because the remaining combinations of Chinese characters are nonsensical and/or do not frequently appear in the annotated corpus). As such, in this example, "市长" (meaning "mayor" in English) is the output Chinese conversion for the input of "shizhang." Had the corpus not been annotated to distinguish between different readings of heteronymous Chinese characters, then the value of Pr(市, 长) (as determined from a corpus that is not annotated) may not be as high as the value of Pr(市, 长_zhang) (and therefore "市长" may not be selected as the output Chinese conversion) because, for example, "长" used in all of its readings ("chang" and "zhang) appear more commonly next to Chinese characters other than "市" in the corpus that is not annotated.

Although the foregoing embodiments have been described in some detail for purposes of clarity of understanding, the invention is not limited to the details provided. There are many alternative ways of implementing the invention. The disclosed embodiments are illustrative and not restrictive.

The invention claimed is:

1. A method, comprising:
at a device having one or more processors and memory:
receiving input data to be converted into a symbolic representation of the input data in a target symbolic system, the symbolic representation comprising a set of characters in the target symbolic system;
identifying a first candidate character for the symbolic representation based on a first portion of the input data, and a second candidate character for the symbolic representation based on a second portion of the input data, wherein the first candidate character has at least a first pronunciation and a second pronunciation each applicable to a respective usage context;
generating a plurality of candidate character strings, including at least a first candidate string comprising at least the first candidate character and the second candidate character; and
converting the input data to a selected one of the plurality of candidate character strings, said converting comprising:
determining a respective probability that the first candidate character string is a correct symbolic representation of the input data using a language model that individually accounts for a respective usage probability of the first candidate character in a first usage context comprising the second candidate character in combination with the first pronunciation of the first candidate character, and not the second pronunciation of the first candidate character, and wherein the language model is trained on an annotated corpus that associates the first pronunciation with the first candidate character used in respective contexts comprising the second candidate character.

2. The method of claim 1, wherein the input text comprises pinyin.

3. The method of claim 1, wherein the input text is resolved into one or more monosyllabic groups of characters that are each converted to a respective candidate character in the target symbolic system.

4. The method of claim 1, wherein the target symbolic system includes Chinese characters.

5. The method of claim 1, wherein the language model is trained using a corpus that has been annotated to distinguish between the first pronunciation of the first candidate character and the second pronunciation of the first candidate character.

6. The method of claim 5, wherein for at least one of the first pronunciation and second pronunciation of the first candidate character, a corresponding new symbol or encoded representation thereof is created and added to the annotated corpus.

7. The method of claim 1, further comprising:
receiving one or more manual input of annotations to a subset of text associated with a corpus, wherein a manual input of annotation indicates for an instance of a heteronymous character an appropriate pronunciation of that heteronymous character based at least in part on a context associated with the instance, wherein an annotation is associated with a symbol associated with that heteronymous character; and
automatically annotating at least a portion of the text associated with the corpus that has not been manually annotated based at least in part on the received one or more manual input of annotations.

8. The method of claim 1, wherein the language model is trained to associate a probability corresponding to the first pronunciation of the first candidate character and a probability corresponding to the second reading pronunciation of the first candidate character.

9. The method of claim 1, wherein the language model is trained to associate a probability corresponding to a first sequence of characters including the first pronunciation of the character and a probability corresponding to a second sequence of characters including the second pronunciation of the character, wherein the first and second sequences each includes two or more characters.

10. A non-transitory computer-readable medium having instructions stored thereon, the instructions, when executed by one or more processors, cause the processors to perform operations comprising:
receiving input data to be converted into a symbolic representation of the input data in a target symbolic system, the symbolic representation comprising a set of characters in the target symbolic system;
identifying a first candidate character for the symbolic representation based on a first portion of the input data, and a second candidate character for the symbolic representation based on a second portion of the input data, wherein the first candidate character has at least a first pronunciation and a second pronunciation each applicable to a respective usage context;
generating a plurality of candidate character strings, including at least a first candidate string comprising at least the first candidate character and the second candidate character; and
converting the input data to a selected one of the plurality of candidate character strings, said converting comprising:
determining a respective probability that the first candidate character string is a correct symbolic representation of the input data using a language model that individually accounts for a respective usage probability of the first candidate character in a first usage context comprising the second candidate character in combination with the first pronunciation of the first candidate character, and not the second pronunciation of the first candidate character, and wherein the language model is trained on an annotated corpus that associates the first pronunciation with the first candidate character used in respective contexts comprising the second candidate character.

11. The computer-readable medium of claim 10, wherein the input text comprises pinyin.

12. The computer-readable medium of claim 10, wherein the input text is resolved into one or more monosyllabic groups of characters that are each converted to a respective candidate character in the target symbolic system.

13. The computer-readable medium of claim 10, wherein the target symbolic system includes Chinese characters.

14. The computer-readable medium of claim 10, wherein the language model is trained using a corpus that has been annotated to distinguish between the first pronunciation and the second pronunciation of the first candidate character.

15. The computer-readable medium of claim 14, wherein for at least one of the first pronunciation and second pronunciation of the first candidate character, a corresponding new symbol or encoded representation thereof is created and added to the annotated corpus.

16. The computer-readable medium of claim 10, wherein the operations further comprise:
receiving one or more manual input of annotations to a subset of text associated with a corpus, wherein a manual input of annotation indicates for an instance of a heteronymous character an appropriate pronunciation of that heteronymous character based at least in part on a context associated with the instance, wherein an annotation is associated with a symbol associated with that heteronymous character; and
automatically annotating at least a portion of the text associated with the corpus that has not been manually annotated based at least in part on the received one or more manual input of annotations.

17. The computer-readable medium of claim 10, wherein the language model is trained to associate a probability corresponding to the first pronunciation of the first candidate character and a probability corresponding to the second pronunciation of the first candidate character.

18. The computer-readable medium of claim 10, wherein the language model is trained to associate a probability corresponding to a first sequence of characters including the first pronunciation of the first candidate character and a probability corresponding to a second sequence of characters including the second pronunciation of the first candidate character, wherein the first and second sequences each includes two or more characters.

19. A system, comprising:
one or more processors; and
memory having instructions stored thereon, the instructions, when executed by one or more processors, cause the processors to perform operations comprising:
receiving input data to be converted into a symbolic representation of the input data in a target symbolic system, the symbolic representation comprising a set of characters in the target symbolic system;
identifying a first candidate character for the symbolic representation based on a first portion of the input data, and a second candidate character for the symbolic representation based on a second portion of the input data, wherein the first candidate character has at least a first pronunciation and a second pronunciation each applicable to a respective usage context;
generating a plurality of candidate character strings, including at least a first candidate string comprising at least the first candidate character and the second candidate character; and
converting the input data to a selected one of the plurality of candidate character strings, said converting comprising:
determining a respective probability that the first candidate character string is a correct symbolic representation of the input data using a language model that individually accounts for a respective usage probability of the first candidate character in a first usage context comprising the second candidate character in combination with the first pronunciation of the first candidate character, and not the second pronunciation of the first candidate character, and wherein the language model is trained on an annotated corpus that associates the first pronunciation with the first candidate character used in respective contexts comprising the second candidate character.

20. The system of claim 19, wherein the input text comprises pinyin.

21. The system of claim 19, wherein the input text is resolved into one or more monosyllabic groups of characters that are each converted to a respective candidate character in the target symbolic system.

22. The system of claim 19, wherein the target symbolic system includes Chinese characters.

23. The system of claim 19, wherein the language model is trained using a corpus that has been annotated to distinguish between the first pronunciation and the second pronunciation of the first candidate character.

24. The system of claim 23, wherein for at least one of the first pronunciation and second pronunciation of the first candidate character, a corresponding new symbol or encoded representation thereof is created and added to the annotated corpus.

25. The system of claim 19, wherein the operations further comprise:
receiving one or more manual input of annotations to a subset of text associated with a corpus, wherein a manual input of annotation indicates for an instance of a heteronymous character an appropriate pronunciation of that heteronymous character based at least in part on a context associated with the instance, wherein an annotation is associated with a symbol associated with that heteronymous character; and
automatically annotating at least a portion of the text associated with the corpus that has not been manually annotated based at least in part on the received one or more manual input of annotations.

26. The system of claim 19, wherein the language model is trained to associate a probability corresponding to the first pronunciation of the first candidate character and a probability corresponding to the second pronunciation of the first candidate character.

27. The system of claim 19, wherein the language model is trained to associate a probability corresponding to a first sequence of characters including the first pronunciation of the first candidate character and a probability corresponding to a second sequence of characters including the second pronunciation of the first candidate character, wherein the first and second sequences each includes two or more characters.

* * * * *